(12) United States Patent
Mekkat et al.

(10) Patent No.: US 10,915,320 B2
(45) Date of Patent: Feb. 9, 2021

(54) SHIFT-FOLDING FOR EFFICIENT LOAD COALESCING IN A BINARY TRANSLATION BASED PROCESSOR

(71) Applicant: Intel Corporation, Santa Clara, CA (US)

(72) Inventors: Vineeth Mekkat, San Jose, CA (US); Xi Chen, San Jose, CA (US); Manjunath Shevgoor, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 59 days.

(21) Appl. No.: 16/231,305

(22) Filed: Dec. 21, 2018

(65) Prior Publication Data

US 2020/0201632 A1    Jun. 25, 2020

(51) Int. Cl.
| | |
|---|---|
| *G06F 9/302* | (2018.01) |
| *G06F 9/315* | (2018.01) |
| *G06F 9/30* | (2018.01) |
| *G06F 9/54* | (2006.01) |
| *G06F 9/38* | (2018.01) |

(52) U.S. Cl.
CPC ........ *G06F 9/30032* (2013.01); *G06F 9/3001* (2013.01); *G06F 9/30134* (2013.01); *G06F 9/384* (2013.01); *G06F 9/544* (2013.01); *G06F 9/30145* (2013.01)

(58) Field of Classification Search
CPC .............. G06F 9/30032; G06F 9/3001; G06F 9/30134; G06F 9/384; G06F 9/544; G06F 9/30043; G06F 9/30145; G06F 9/3016; G06F 9/3818; G06F 9/382; G06F 9/3822

USPC .................. 712/205, 213, 221; 708/209, 490
See application file for complete search history.

(56) References Cited

U.S. PATENT DOCUMENTS

| | | | |
|---|---|---|---|
| 4,713,749 A * | 12/1987 | Magar | G06F 9/30167 712/241 |
| 6,026,485 A | 2/2000 | O'Connor et al. | |
| 6,292,935 B1 * | 9/2001 | Lueh | G06F 9/45516 717/148 |
| 6,775,765 B1 | 8/2004 | Lee et al. | |
| 7,003,629 B1 | 2/2006 | Alsup et al. | |
| 7,543,284 B2 | 6/2009 | Bolton et al. | |
| 7,694,110 B1 | 4/2010 | Alsup et al. | |
| 8,725,989 B2 | 5/2014 | Madajczak et al. | |
| 8,756,591 B2 | 6/2014 | Gschwind et al. | |
| 9,652,246 B1 | 5/2017 | Tam et al. | |
| 2002/0124158 A1 | 9/2002 | Samra et al. | |

(Continued)

FOREIGN PATENT DOCUMENTS

WO    2018009378 A1    1/2018

OTHER PUBLICATIONS

Intel Corporation, "Intel® 64 and IA-32 Architectures Software Developer's Manual," vol. 2 (2A, 2B, 2C & 2D), Instruction Set Reference, A-Z, Order No. 325383-060US, Sep. 2016, 2198 pages.

*Primary Examiner* — Daniel H Pan
(74) *Attorney, Agent, or Firm* — NDWE, LLP

(57) ABSTRACT

A processor includes an instruction fetch circuit to retrieve instructions from memory, and a decode unit circuit to decode retrieved instructions. The decode unit circuit identifies a shift instruction, accumulates a shift folded immediate value to track a number of bit positions shifted for a source register, and prevents the shift instruction from allocation to an execution unit of the processor.

17 Claims, 20 Drawing Sheets

(56) References Cited

U.S. PATENT DOCUMENTS

| | | |
|---|---|---|
| 2005/0120191 A1 | 6/2005 | Akkary et al. |
| 2009/0327661 A1 | 12/2009 | Sperber et al. |
| 2012/0005444 A1 | 1/2012 | Rupley et al. |
| 2012/0284489 A1 | 11/2012 | Plondke et al. |
| 2013/0151819 A1 | 6/2013 | Piry et al. |
| 2014/0032884 A1 | 1/2014 | Krishna et al. |
| 2014/0149722 A1 | 5/2014 | Brown et al. |
| 2015/0227365 A1* | 8/2015 | Sudhakar ............ G06F 9/30145 712/221 |
| 2015/0261537 A1 | 9/2015 | Cha et al. |
| 2016/0328236 A1* | 11/2016 | Kamatsuka ................ G06F 8/41 |
| 2017/0123799 A1* | 5/2017 | Sperber ................. G06F 9/3016 |

\* cited by examiner

| Before Load Coalescing | After Load Coalescing | With Shift Folding |
|---|---|---|
| LD.8 r0, [A]              | LD.32 r0, [A]        | LD.32 r0, [A] |
| ADD.8 r4, r4, r0          | ADD.8 r4, r4, r0     | ADD.8 r4, r4, r0 |
| ...                       | ...                  | ... |
| LD.8 r1, [A+1]            | SHIFT r0, r0, 8      | SHIFT r0, r0, 8 |
| ADD.8 r4, r4, r1          | ADD.8 r4, r4, r0     | ADD.8 r4, r4, (r0 >> 8) |
| ...                       | ...                  | ... |
| LD.8 r2, [A+2]            | SHIFT r0, r0, 8      | SHIFT r0, r0, 8 |
| ADD.8 r4, r4, r2          | ADD.8 r4, r4, r0     | ADD.8 r4, r4, (r0 >> 16) |
| ...                       | ...                  | ... |
| LD.8 r3, [A+3]            | SHIFT r0, r0, 8      | SHIFT r0, r0, 8 |
| ADD.8 r4, r4, r3          | ADD.8 r4, r4, r0     | ADD.8 r4, r4, (r0 >> 24) |

FIG. 1A

|  | A | r0 | r4 | SFIMM | Comments |
|---|---|---|---|---|---|
| Start | 0x05060708 | 0x0 | 5 | 0 | |
| LD.32 r0 [A] | | 0x05060708 | | | |
| ADD.8 r4, r4, r0 | | | 5+8 | 0 | r4 + lowest byte of r0 |
| ... | | | | | |
| SHIFT r0, r0, 8 | | 0x05060708 | 13 | 8 | r0 shift immediate value folded to SFIMM |
| ADD.8 r4, r4, r0 | | | 13+7 | | r4 + lowest byte of r0 shifted by SFIMM |
| ... | | | | | |
| SHIFT r0, r0, 8 | | 0x05060708 | 20 | 16 | next shift imm of 8 added to current SFIMM |
| ADD.8 r4, r4, r0 | | | 20+6 | | r4 + lowest byte of r0 shifted by SFIMM |
| ... | | | | | |
| SHIFT r0, r0, 8 | | 0x05060708 | 26 | 24 | next shift imm of 8 added to current SFIMM |
| ADD.8 r4, r4, r0 | | | 26+5 | | r4 + lowest byte of r0 shifted by SFIMM |

FIG. 1B

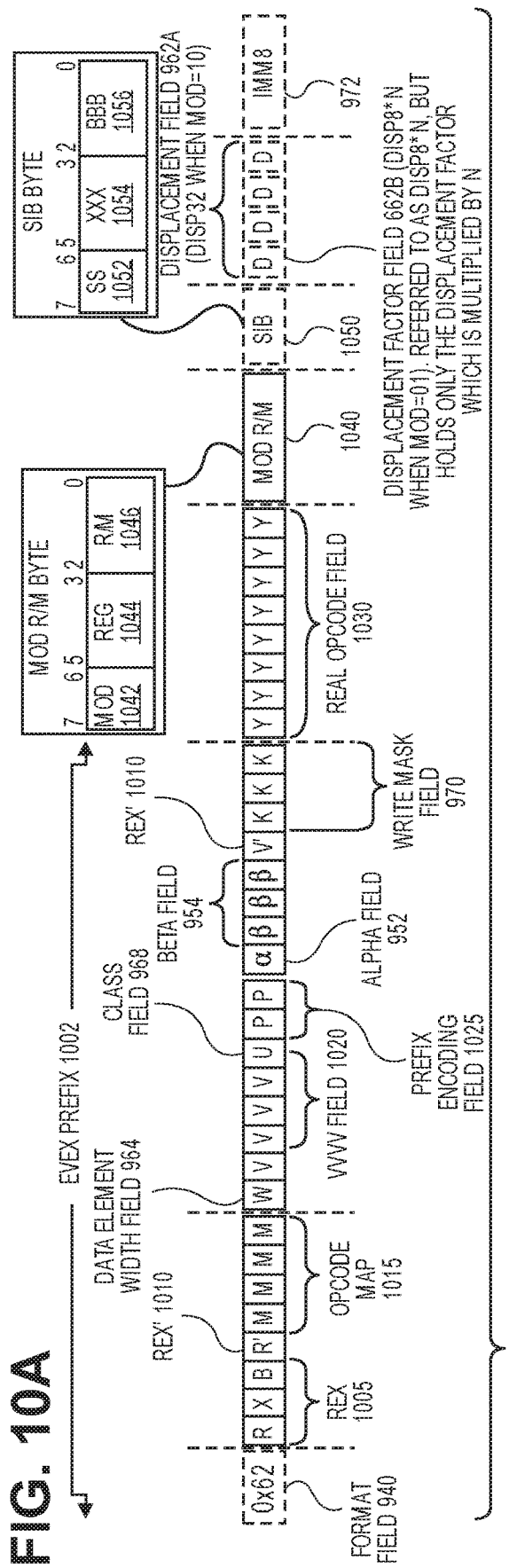
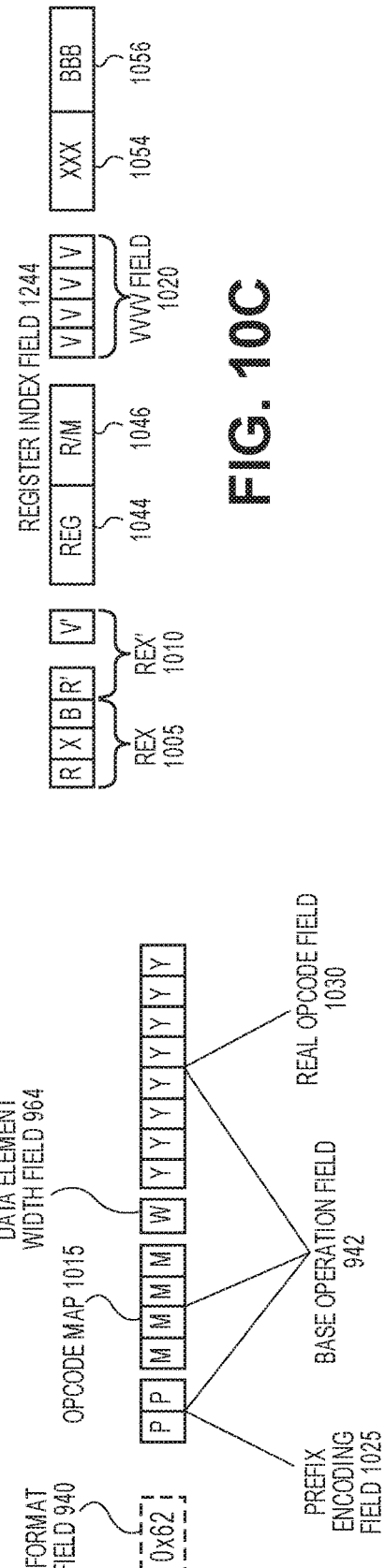
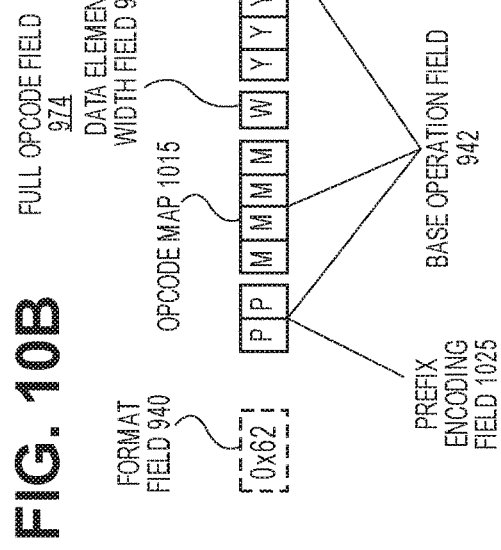
FIG. 10A
FIG. 10B
FIG. 10C

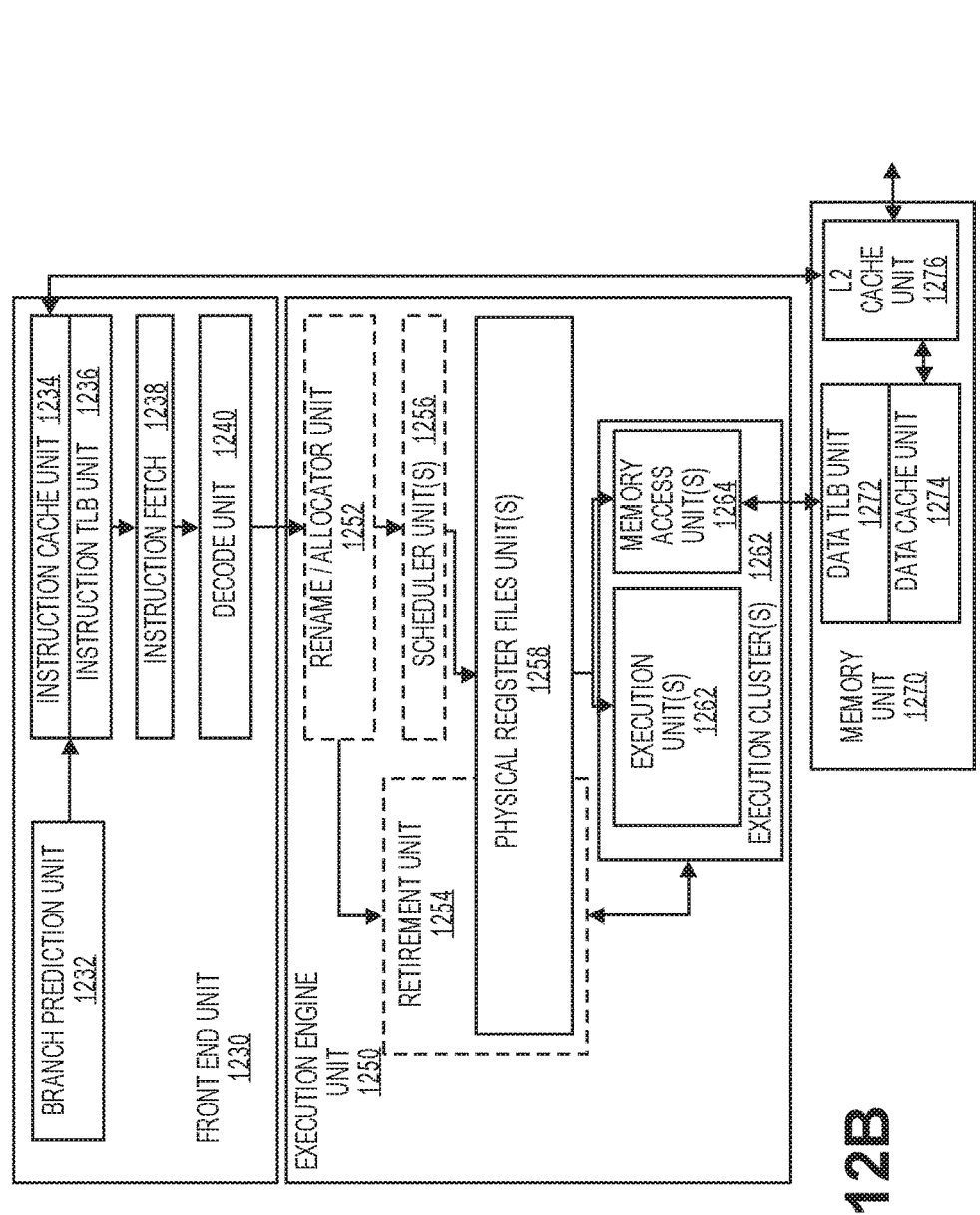

SHIFT-FOLDING FOR EFFICIENT LOAD COALESCING IN A BINARY TRANSLATION BASED PROCESSOR

TECHNICAL FIELD

Embodiments of the invention relate to the field of processing logic; and more specifically, to dynamic optimization of instructions in a processor to improve load coalescing and shift operations.

BACKGROUND

In modern computer architectures a single instruction set architecture (ISAs) is typically implemented in a set of one or more central processing units (CPU). The CPUs execute programs as a set of instructions that have been compiled where the instructions are supported by the single ISA. The compiler optimizes the set of instructions to efficiently run in the ISA. The CPUs load and execute the instructions during runtime.

During runtime execution, the CPUS can process instructions out of order. Out-of-Order execution is a process where the instructions are executed by the CPUs in a different order than the instructions occur in the program. Out-of-order execution could cause some instructions to be scheduled to execute before the inputs of these instructions is available. Thus, the CPUs include scheduling and pipelining logic that enables out-of-order execution to be implemented while minimizing the inefficiency of instruction executions by taking into account the input and output dependencies between instructions in the scheduling of the instructions for out-of-order execution.

BRIEF DESCRIPTION OF THE DRAWINGS

The invention may best be understood by referring to the following description and accompanying drawings that are used to illustrate embodiments of the invention. In the drawings:

FIG. 1A is a diagram of one embodiment of code optimized for shift folding.

FIG. 1B is a diagram of one embodiment of the execution of the code using shift folding.

FIG. 9A is a block diagram illustrating a generic vector friendly instruction format and class A instruction templates thereof according to embodiments of the invention.

FIG. 9B is a block diagram illustrating the generic vector friendly instruction format and class B instruction templates thereof according to embodiments of the invention.

FIG. 10A is a block diagram illustrating an exemplary specific vector friendly instruction format according to embodiments of the invention.

FIG. 10B is a block diagram illustrating the fields of the specific vector friendly instruction format 1000 that make up the full opcode field 974 according to one embodiment of the invention.

FIG. 10C is a block diagram illustrating the fields of the specific vector friendly instruction format 1000 that make up the register index field 944 according to one embodiment of the invention.

FIG. 12A is a block diagram illustrating both an exemplary in-order pipeline and an exemplary register renaming, out-of-order issue/execution pipeline according to embodiments of the invention.

FIG. 12B is a block diagram illustrating both an exemplary embodiment of an in-order architecture core and an exemplary register renaming, out-of-order issue/execution architecture core to be included in a processor according to embodiments of the invention.

FIG. 13A is a block diagram of a single processor core, along with its connection to the on-die interconnect network 1302 and with its local subset of the Level 2 (L2) cache 1304, according to embodiments of the invention.

FIG. 13B is an expanded view of part of the processor core in FIG. 13A according to embodiments of the invention.

FIG. 15 shown a block diagram of a system in accordance with one embodiment of the present invention.

FIG. 16 is a block diagram of a first more specific exemplary system in accordance with an embodiment of the present invention.

FIG. 17 is a block diagram of a second more specific exemplary system in accordance with an embodiment of the present invention.

FIG. 18 is a block diagram of a SoC in accordance with an embodiment of the present invention.

DETAILED DESCRIPTION

Figure 2:
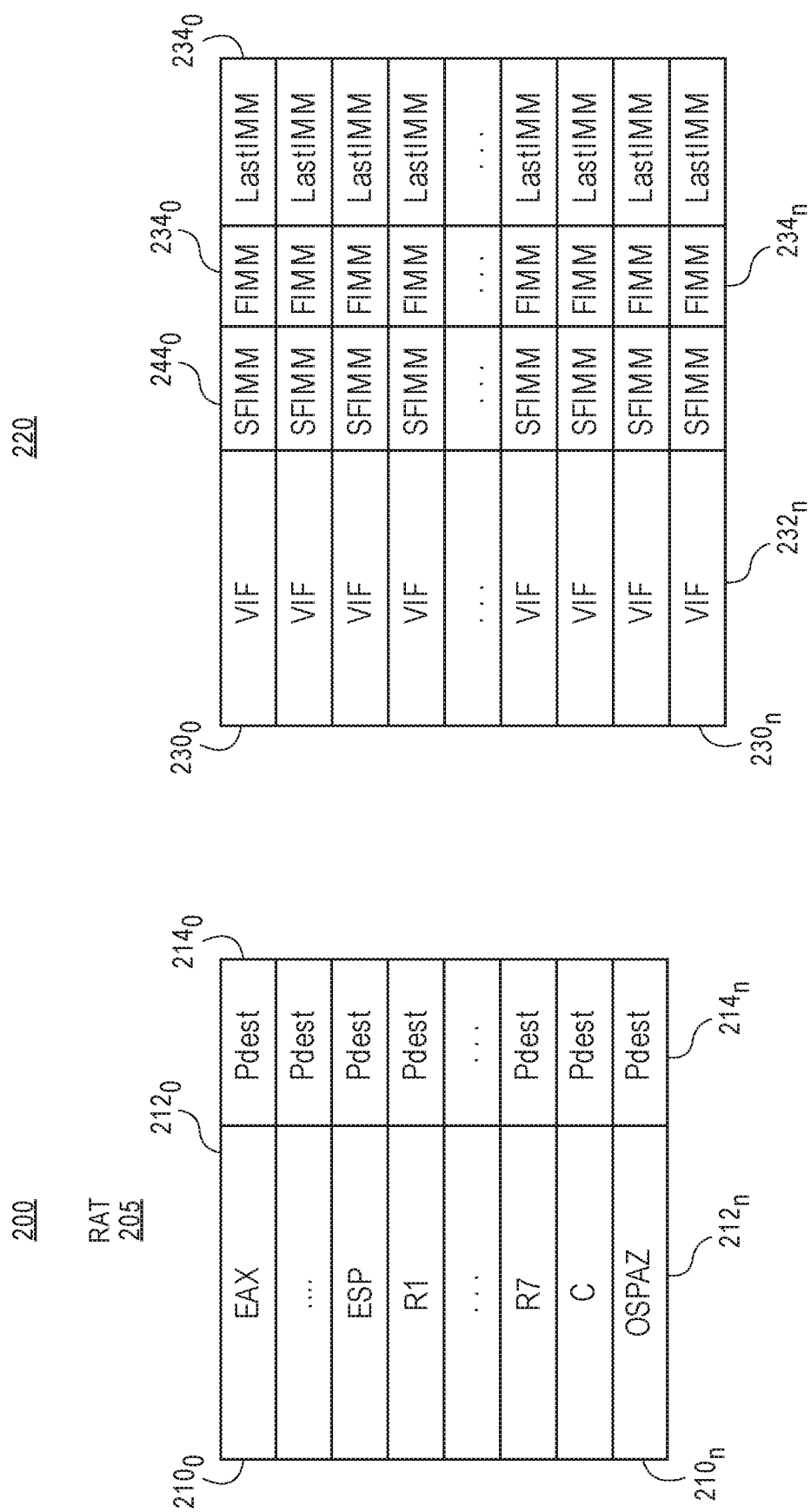
FIG. 2 is a diagram of one embodiment of a register rename alias table and related structures.

The following description describes methods and apparatus for dynamic optimization of instructions at run-time that improve load coalescing and similar instruction sequences using shift folding. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments provide a process for dynamic optimization of instructions in an out-of-order processor at runtime. The dynamic optimizations supported by the processors of the embodiments can include load coalescing where two smaller load instructions are coalesced into to a single larger load instruction. For example, two 32-bit loads can be coalesced into a single 64-bit load instruction. However, this load coalescence optimization results in the addition of a shift instruction to enable a consumer of one of the 32-bit loads to access the loaded data, because the data is placed in an upper address (i.e., where the 64-bit load places 32-bits in an upper address and 32-bits in a lower address of a destination), rather than in an expected lower address. The use of an extra shift operations means a lower benefit in terms of compute utilization from the load coalescing optimization, because the shift operation is relatively compute expensive.

The existing solution for correctness of load coalescing optimization is to insert a shift instruction to align data properly for the consumer of the upper half address. As mentioned, shifts are expensive instructions that consume both power and execution bandwidth, thus, reducing the benefit of load coalescing optimization. Load coalescing is provided as an example context by way of example and not limitation. On skilled in the art would understand that the principles, structures, and techniques described herein with relation to load coalescing are also applicable to other contexts where the solution of 'shift-folding' can be employed to optimize runtime execution of instructions.

The solution proposed here aims to use a 'shift-folding' process and hardware support to overcome the inefficiencies of inserting a shift operation for load coalescing. The embodiments provide advantages including higher compute performance and improved power efficient handling of shift operations resulting from load coalescing. The embodiments can be combined with the process for immediate folding (IF) and the IF hardware support to reduce the total amount of hardware required to implement both processes.

The embodiments are described with relation to an example load coalescing (LDC) optimization. Table I below shows a high-level example of load coalescing:

TABLE I

| Instructions Before LDC | Instructions After LDC |
|---|---|
| LD.32 r1, [A] | LD.64 r1, [A] |
| ADD r1, 1 | ADD r1, 1 |
| . . . | . . . |
| LD.32 r2, [A + 4] | SHIFT.32 r2, r1 |
| ADD r2, 1 | ADD r2, 1 |

In the example of Table I, the instruction sequence includes a first load (LD.32 r1, [A]) and a second load (LD.32 r2, [A+4]). In this example, the first load (LD.32 r1, [A]) retrieves a 32 bit value from location [A] and places it in register r1. The second load (LD.32 r2, [A+4]) retrieves a different 32 bit value from location [A+4] and places it in register r2. In this notation, [A+4] indicates an address A plus 4 bytes (32 bits) after. Therefore, in this instruction sequence the two loads are accessing two adjacent 32-bit values. The optimized instruction sequence has replaced the first 32-bit load with a 64-bit load (LD.64 r1, [A]) where the 64-bit value at address A is loaded into register r1. A shift.32 is inserted in place of the second 32-bit load to shift the upper 32 bits into register r2 such that it can be utilized by subsequent instructions. While this optimization reduces the number of load instructions, which have significant affect on performance, the shift instruction that is inserted in place of the load introduces a new inefficiency caused by overhead associated with the new shift instruction.

In the example optimized instructions sequence above, the input value for the second ADD instructions is in the upper 32 bits of r1 and is shifted out with an explicit shift instruction (shift.32 r2, r1). The use of this extra shift operations mean lower benefit from the load coalescing optimization. From experiments, it has been observed that load coalescing increases the number of shifts by about 2-3% of total instruction count, resulting in a potential performance impact of around 1-2%.

The embodiments provide a shift folding process to overcome the inefficiency of load coalescing by efficiently handling the shifts resulting out of the load coalescing optimization. The shift folding process represents the shifted value by using a physical register file (PRF) entry and a folded immediate value (FIMM) (such as 32 in the example above). Immediate folding is a process that removes additional or subsequent operations between an integer register and an immediate value by accumulating (i.e., 'folding') small intermediate values at allocation into a wider accumulator folded immediate value (FIMM) and saving the folded immediate value in an immediate buffer. Once folded, this integer register can be represented by its PRF entry where the PRF entry is pointed to by the register rename alias table (RAT) state, the FIMM value that is stored in the immediate buffer, and the operation to be performed on the FIMM (e.g., shift).

The shift folding process removes the shift instruction that shifts a register by an immediate (IMM) value by saving the folded immediate value in the RAT. Once folded, a general purpose register (GPR) register can be represented by its PRF entry shifted by the folded IMM value. When the register value can no longer remain folded (i.e., the value is to be stored or similarly consumed), the value will be unfolded into the destination register.

The embodiments thereby provide the benefits being able to cancel the microoperation (µop) destination physical register (PDst) allocation, mark the µop as silent and prevent allocation to the Reservation Station (RS), and the µop will be marked as eligible for Move Elimination ("ME") toward RAT renaming array and override logic. Overall, the embodiments reduce the power and performance impact of the 2-3% shift instructions added due to load coalescing. The performance benefit of this is expected in the range of 1% speedup.

The immediate folding (IF) process removes the addition or subsequent interactions of a register and 11-bit IMM value by accumulating (folding) the small IMM values at allocation into a wider accumulator (i.e. as a folded immediate value) and saving the folded immediate value in the RAT. Once folded, a GPR register can be represented by its PRF entry plus the Folded IMM value. When the register value can no longer remain folded, the value will be unfolded into the destination register of the target register. Making the execution of these operations into zero delay operations reduces the dependency chain and increases performance.

The shift folding mechanism can operate in combination with immediate folding hardware support, which helps to reduce the overhead associated with the shift folding support. Shift folding can be combined with IF by using a shared immediate array recovery to support shift-folding. In some embodiments, additional shift units are added to support the optimization effectively. In other embodiments, existing shift units can be used at the cost of additional latency. Unfolding for shift folding is similar to the support for unfolding IF, however shift folding will utilize additional shift HW in addition to the existing unfolding adders. Flag generation and folding cancellation can be applied by sharing logic with IF. Shift folding can utilize similar techniques to IF for supporting dependent µops in the same issue RAT window—the RAT will calculate an Imm InLine control based on the source to destination match and the folded µop indication.

The shift folding optimization can support accumulating-shift cases naturally in combination with IF accumulating. For example, in some embodiments many loads can be coalesced in to a single large load (e.g., eight 8-bit loads can be coalesced to one 64-bit load). When there arises overflow situations due to the shift size, shared unfolding mechanisms can be used to recover.

In various embodiments, a processor includes logic or other circuitry to determine when instructions can be folded or removed from an execution portion of a pipeline, by way of so-called shift folding. More specifically as described herein, embodiments may identify certain incoming instructions, e.g., particular integer-based instructions, and provide for a non-execution unit-based handling of such instructions in a manner to increase performance (e.g., by way of instruction per cycle (IPC) increase) and reduce a dependency chain. Such integer-based instructions may include so-called immediate values, which are numerical values provided with an instruction to be used as an additional source of data for instruction execution. Folding an immediate value of certain operations thus enables execution of such operations with zero clock delay, and without execution in execution logic. As such, embodiments increase performance (including IPC) by reducing the critical dependency chain.

As an example, shift folding as described herein can remove additional/subsequent operations between an integer register and an immediate value by accumulating (folding) small immediate values at allocation into a wider accumulator folded immediate value (FIMM) and saving the folded immediate value in an immediate buffer. Once folded, this integer register can be represented by its physical register file (PRF) entry (at its PRF entry pointed by the RAT state) and the FIMM value (stored in the immediate buffer) and the operation (e.g., shift operation). In turn, when the register value can no longer remain folded, the value is unfolded into a destination register of the target register. The unfolding operation can be performed as part of the operation that caused the unfolding.

Although the scope of the present invention is not limited in this regard, shift folding as described herein may be used in connection with all shift operations involving a single source and an immediate (note that one or both of the source and immediate may be explicit or implicit).

In one embodiment, decode logic may detect shift folding opportunities such as shift operations between two registers. Instead of executing such shift operations during an execution phase of a pipeline, the immediate value of the number of positions to be shifted is accumulated into a dedicated folded immediate (FIMM) buffer at allocation phase. In this way, shift folding cuts the long dependency of a repeated operation with a small immediate. For given code, such folding can remove a significant number of operations and allow other operations that reside on the critical path to run faster by better utilizing available resources.

In one example, the immediate value may be limited to a certain size, e.g., less than a threshold width. To support shift folding as described herein, a shift folded immediate (SFIMM) buffer may be provided within a processor, and which may be associated with a RAT. Entries in this buffer may be inserted during an allocation phase when a particular instruction is identified for shift folding. In some embodiments, the RAT can include a separate SFIMM and field for shift folding and immediate folding, respectively. In further embodiments, a single S/FIMM field is utilized in the RAT for both shift folding and immediate folding.

FIG. 1A is a diagram of one example of the shift folding process. The code on the left-hand column labeled 'Before Load Coalescing,' shows a code sequence with four load operations each followed by an addition operation. The first load operation (LD.8 r0, [A]) loads an 8-bit value at address A into a register r0. The first load operation is followed by an addition operation that adds the value of register r4 with the loaded value of register r0 and stores the result in register r4. The second load operation (LD.8 r1, [A+1]) loads an 8-bit value at address A+1 (which is the 8-bits immediately after the value stored address at A) into a register r1. The second load operation is followed by a second addition operation that adds the value of register r4 with the loaded value of register r1 and stores the result in register r4. The third load operation (LD.8 r2, [A+2]) loads an 8-bit value at address A+2 (which is the 8-bits immediately after the value stored address at A+2) into a register r2. The third load operation is followed by a third addition operation that adds the value of register r4 with the loaded value of register r2 and stores the result in register r4. The fourth load operation (LD.8 r1, [A+3]) loads an 8-bit value at address A+3 (which is the 8-bits immediately after the value stored address at A) into a register r3. The fourth load operation is followed by a fourth addition operation that adds the value of register r4 with the loaded value of register r3 and stores the result in register r4.

In the center column of the example of FIG. 1A the load operations have been 'coalesced' into a single load operation. This load coalescing process can occur during runtime optimizations or under similar circumstances. The load coalescing process recognizes multiple loads to adjacent memory locations (e.g., adjoining addresses or similar circumstances) and replaces these loads with a single load of a larger memory range (e.g., combining four 8-bit loads into a single 32-bit load). However, the combined loaded data is in a register where the individual values are not in location that subsequent operations are configured to utilize. Thus, a set of shift operations are utilized to move the values within the larger register to position the values into a location that the subsequent instructions can utilize. The subsequent instructions can also be adjusted to facilitate this positioning of the loaded data.

In the example of FIG. 1A, the load coalesced code has been changed such that the first load operation has been converted from an 8-bit load operation into a 32-bit load operation with the data at address A through A+3 loaded into a register r0. Thus, in the example a single load operation is utilized in place of four load operations. The three replaced load operations have been replaced with shift operations. The add operations operate on the lower 8-bits of the register and the shifting operations rotate the loaded values into the lowest 8-bits of the register r0. Thus, the first add operation is unchanged and adds the value in register r4 with the lowest value in r0. The second add operations adds the value in r4 with the value in the register r0 after the first 8-bit shift of register r0. The third add operation adds the value in r4 with the value in the register r0 after the second 8-bit shift of register r0. The fourth add operation adds the value in r4 with the value in the register r0 after the third 8-bit shift of register r0.

In the third column of FIG. 1A provides an example of shift folding. This process is implemented during execution and the code sequence itself is not changed the changes are provided by way of illustration. With the shift folding process, the shift operations are not performed. Instead, the second, third, and fourth add operation are executed using values stored in a special register such as in a SFIMM field or similar locations. During allocation of the shift instructions, when shift folding opportunity is identified, the actual shift operation is suppressed and instead, the shift immediate is folded to the corresponding register's SFIMM field. The values in the SFIMM fields can be utilized to perform shifting on the fly with additional shift units connected to the SFIMM field, when a consumer instruction (such as the ADD.8 in the example) is executed. This improves the IPC of the code sequence as against a traditional execution of the shift where the ADD.8 is executed when the SHIFT instruction completes execution in the generic shift ALU. Thus, the IPC of the code sequence can be improved using shift-folding.

FIG. 1B is a diagram of one embodiment of an example of the execution of the code of FIG. 1B. The FIG. 1B includes a starting condition, where the address [A] includes a value 5678, that is 32-bits long with the first 8 bits being the value 5, the second 8 bits being the value 6, the third 8 bits being the value 7 and the fourth 8 bits being the value 8. In the execution of the first load instruction LD.32, the value 5678 is loaded into register r0. The register r4 has a starting value of 5 and the SFIMM has an initial value of 0. After the instruction Add.8 is executed, the value of r4 (i.e., 5) is added to the lowest 8 bits of register r0 and the result (i.e., 13) is placed in register r4. The next shift instruction has been folded (i.e., suppressed) and is thus not executed, thus the value in the register r0 is unchanged (i.e., 5678) whereas the value in r4 is unchanged. The SFIMM is incremented by 8 indicating that the register r0 is to be shifted by 8 bits to be in the correct position or have the correct value.

The next add instruction (i.e., Add.8 r4, r4, r0) is executed, but add the value from a position in R0 that is 8-bits to the left, where the position is derived from the SFIMM value. The Add.8 operands can be adjusted at execution to adjust for the folded shift, while still obtaining the correct value from the unshifted register r0. Thus, 7 is added to the current value of r4 to get the value 20 in r4.

Similarly, the next two shift operations are folded and the subsequent Add instructions derive their r0 operand from the SFIMM value. The SFIMM value is increased by 8 for each suppressed shift instruction in this example. If the shifts had been more or less than 8 bits, then the SFIMM value would have been incremented commensurately for such folded shifts. At the end of this instruction sequence, the SFIMM value is 24, but the r0 value is unchanged. If a further operation on r0 is encountered that requires the actual current value to be present in r0, i.e., it can't be readily derived and provided to the instruction or the register value is to be updated by the instruction, then the 'unfolding' process shifts the values in register r0 by the current SFIMM value in a single shift operation to update the value of register r0. Updating the register r0 with a single shift operation at the point of unfolding is more efficient overall than performing multiple incremental shift operations.

FIG. 2 is a block diagram of one example of a register rename alias table and related structures. Circuitry 200 may be part of a processor such as a given multicore processor or other system on a chip (SoC). Circuitry 200 includes a RAT 205 and a folded immediate buffer 220. Although shown as separate structures in the embodiment of FIG. 2, in some embodiments, the folded immediate buffer 205 may be implemented as additional fields within RAT 205. Such additional RAT state may include, per integer register: a valid indicator (VIF) to indicate that a folded immediate is stored for that value; a folded immediate field (FIMM) which may be a given number of bits, and a shift-folded immediate (SFIMM) which also may be a given number of bits. In other embodiments, a single shared S/FIMM field is utilized.

Each flag group represented in the RAT 205 may also be associated with an additional field to be used in the event of flag reconstruction: (LastIMM) last immediate value, an immediate value associated with a folded instruction (that is, the last immediate value added to a folded or shift-folded immediate value), can also be stored in the immediate buffer 220 as a field. In further embodiments, a separate LastS-FIMM field is utilized to separately track a preceding SFIMM value.

RAT 205 maps a set of logical registers to a set of physical registers and includes a plurality of entries $210_0$-$210_n$. As seen, each entry includes multiple fields, including a logical identifier field $212_0$-$212_n$ identifying a logical register and a corresponding physical identifier field $214_0$-$214_n$ that identifies a physical register. In an embodiment, there may be a corresponding entry for each architectural register of a processor. Such registers can include a variety of well-known architectural registers, such as an accumulator register (EAX), a stack pointer register (ESP), general purpose registers (GPRs) (e.g., R1-R7), and flag registers. Specifically, as shown in FIG. 2, an entry $210_{n-1}$ may be associated with a carry flag register (C) and entry $210_n$ may be associated with an OSPAZ flag register, which provides various flag information, including in one embodiment, an overflow (O) flag, a sign flag (S), a parity flag (P), an auxiliary flag (A) and a zero flag (Z). As further illustrated, each entry 210 further includes a corresponding physical identifier field $214_0$-$214_n$. Each such field may store an identifier or other pointer to a physical register associated with the corresponding architectural register, which may be stored in a PRF of the processor.

Folded immediate buffer 220 includes corresponding entries $230_0$-$230_n$. Each such entry 230 is associated with a corresponding entry 210 in RAT 205. As discussed above, in some implementations folded immediate buffer 220 can be implemented as additional fields within RAT 205. In the embodiment shown, each entry 230 includes various fields to store information. A valid field $232_0$-$232_n$ is to store a valid indicator to indicate that a valid folded or shift-folded immediate is stored for the corresponding value. A second field $234_0$-$234_n$ is a folded immediate field configured to store a corresponding folded immediate value (FIMM). For the shift-folded immediate (SFIMM) value the fields $244_0$ to $244_n$ can be utilized. In one embodiment, a maximum width of second field 234 may be 13 bits. As further illustrated, a third field $236_1$ and $236_2$ is provided for entries $230_{n-1}$ and $230_n$ associated with the flag registers, to enable storage of a last immediate value (LastIMM), which corresponds to a last immediate value, namely the immediate value of a folded instruction last accumulated into the FIMM and generated one of the flags fields. As mentioned, in further embodiments a LastSFIMM field can be similarly used to track a separate last SFIMM value.

With the information present in folded immediate value buffer 220, flag values can be reconstructed even where the corresponding instructions (that generate both data and flag portions) are folded and thus not executed within the execution logic of the processor. FIG. 2 is provided by way of illustration and not limitation, one skilled in the art would understand these structures are shown at a high level and many variations and alternatives are possible.

Figure 3:
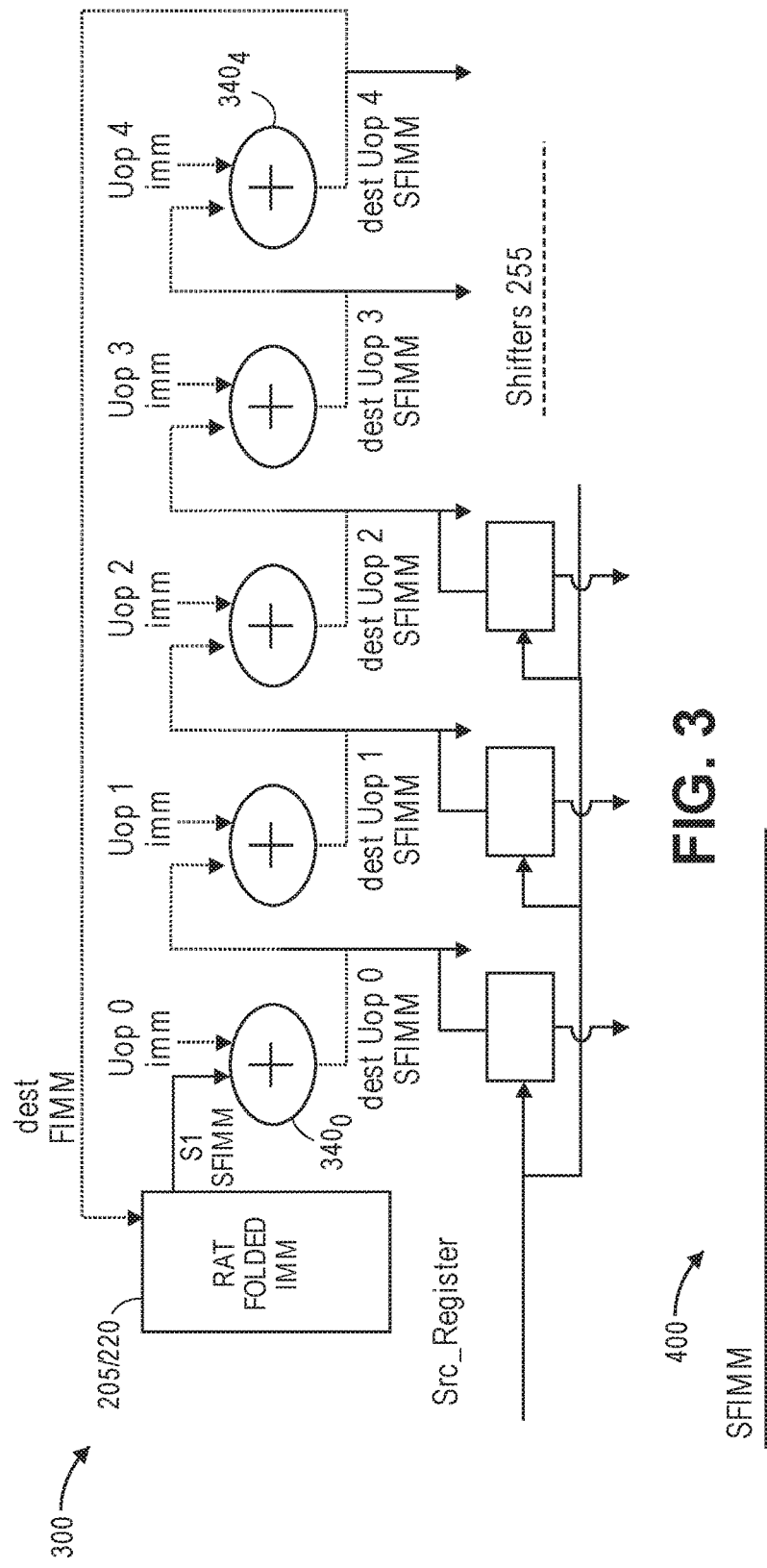
FIG. 3 is a diagram of one embodiment of logic associated with shift folding.

FIG. 3 is a block diagram of additional logic associated with a folded immediate buffer in accordance with an embodiment. Folded immediate buffer 220 is provided and may include multiple entries, as discussed above. As further shown in FIG. 3, a plurality of adder circuits $340_0$-$340_4$ are associated with folded immediate buffer 220. Note that these adder circuits $340_0$-$340_4$ are separate and apart from any execution logic of a processor pipeline. For example, such adder circuits may be implemented within the RAT/folded immediate buffer structures themselves such that they are not on the critical path. Such adder circuits may be leveraged to perform immediate value addition as entries are allocated into folded immediate buffer 220. In the illustrated example, five adder circuits are shown, however, any number of adder circuits can be utilized, e.g., depending on the μop-allocation width of the processor.

In one embodiment, each shift-folded instruction or μop has a SFIMM and a current IMM of the μop. If the first μop of an allocation window is shift-folded, then first adder $340_0$ will produce the SFIMM of the destination of that μop. If the second μop of the allocation window is to be shift-folded, then initial value is further added to obtain the next SFIMM. If the destination of the first μop is used as a source of the second μop, then the SFIMM of the second μop is the shifted value of the SFIMM of the register and the current IMM of both μops.

Adder circuits 340 are coupled to receive as a source an output of a preceding adder circuit when all μops have the same source. Each adder circuit 340 however will have a separate output SFIMM. Otherwise each adder circuit 340 is separated and the SFIMM value is read from the array. In general, each μop can read the shifted data from each of the μops that precedes it or from the array.

At allocation of a folded μop, the SFIMM stored in the RAT FIMM array per source operand will be read. Then, the per-μop IMM value associated with the destination is added and stored in the RAT entry of the destination register. As illustrated in FIG. 3, each adder circuit 340 is configured to receive a corresponding source immediate value (which may correspond to a previously shifted immediate value) from folded immediate buffer 220 (or an upstream shift circuit) and perform a shift with an incoming immediate value of a μop to be shift-folded. In turn, each adder circuit 340 is configured to output a shifted folded immediate value, which may be provided to a downstream adder circuit associated with a succeeding μop to be folded (and further to be stored in a corresponding entry of folded immediate buffer 220 associated with a destination of the folded μop).

For purposes of illustration reference is made to adder circuit $340_0$, which is configured to receive a first source shift-folded immediate value (S1 SFIMM) from folded immediate buffer 220 and add that value the number of bits based on the immediate value (μop 0 imm) of a first μop to be folded. And in turn, add circuit $340_0$ outputs a shift-folded immediate value (dest μop 0 SFIMM) to be associated with a destination of the shift-folded instruction. Note that shift-folded immediate data may either be used as a source by each allocated μop or may be unfolded. That is, shift-folded IMM data may either be used as a source by each allocated μop or be unfolded. Unfolding is performed when folding is no longer possible. This can occur when the size of the SFIMM exceeds the maximal value that can be stored in the SFIMM buffer, or when the folded value is consumed by an operation that cannot be folded.

A set of additional shift units 255 are placed near the RAT, like the adder for folding the immediate values, these additional shift units 255 consume the source register and the SFIMM value and provide the shifted value to the consumers. The additional shift units can be of any size or type dependent on the instruction sizes and architecture. In one example, each shift unit is an 8-bit shift unit and the set of shift units 255 can shift each 8-bits of the source register 8-bits in parallel or individually to provided shifted values to consumers.

Figure 4:
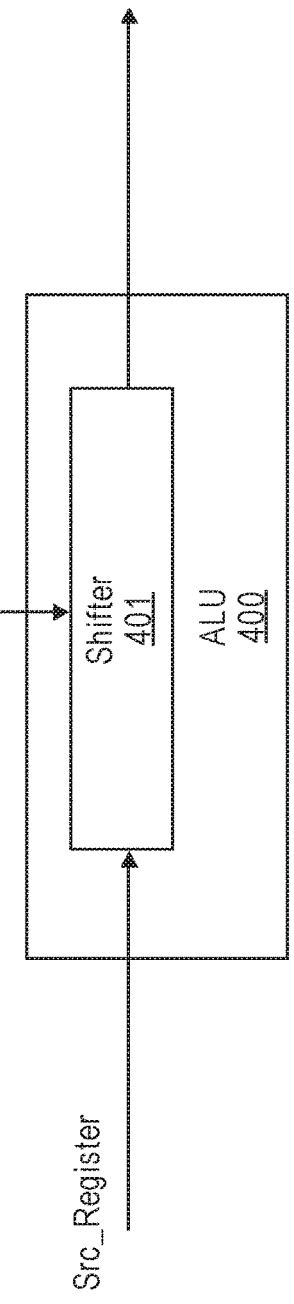
FIG. 4 is a diagram of one embodiment of an arithmetic logic unit (ALU).

As discussed above, when a given instruction cannot be shift-folded, such as where shift operation is to be performed on two source non-adjacent values, an unfolding operation may be performed. Referring now to FIG. 4, shown is a block diagram of an arithmetic logic unit (ALU) 400 in accordance with an embodiment. Note that in some cases, ALU 400 may be a standalone unit, e.g., associated with RAT/folded immediate buffer structures, such that when unfolding is to be performed, it can be performed off the critical path and apart from ALUs or other logic circuits of an execute logic of the processor pipeline.

The ALU 400 can include a shifting circuit 401 to shift the value of the source register a number of positions based on the SFIMM value at the time of the unfolding. The output value can replace the value of the source register and/or provided to any consumers of the value that necessitated the unfolding operation.

This structure is provided by way of illustration and not limitation, one skilled in the art would understand this structure is shown at a high or abstracted level and many variations and alternatives are possible. Other unfolding schemes can be generated per operation and per the timing constraints of the ALU and other execution logic structures. Embodiments may thus provide a performance increase and an increased number of operations executed within a given timeframe.

Figure 5:
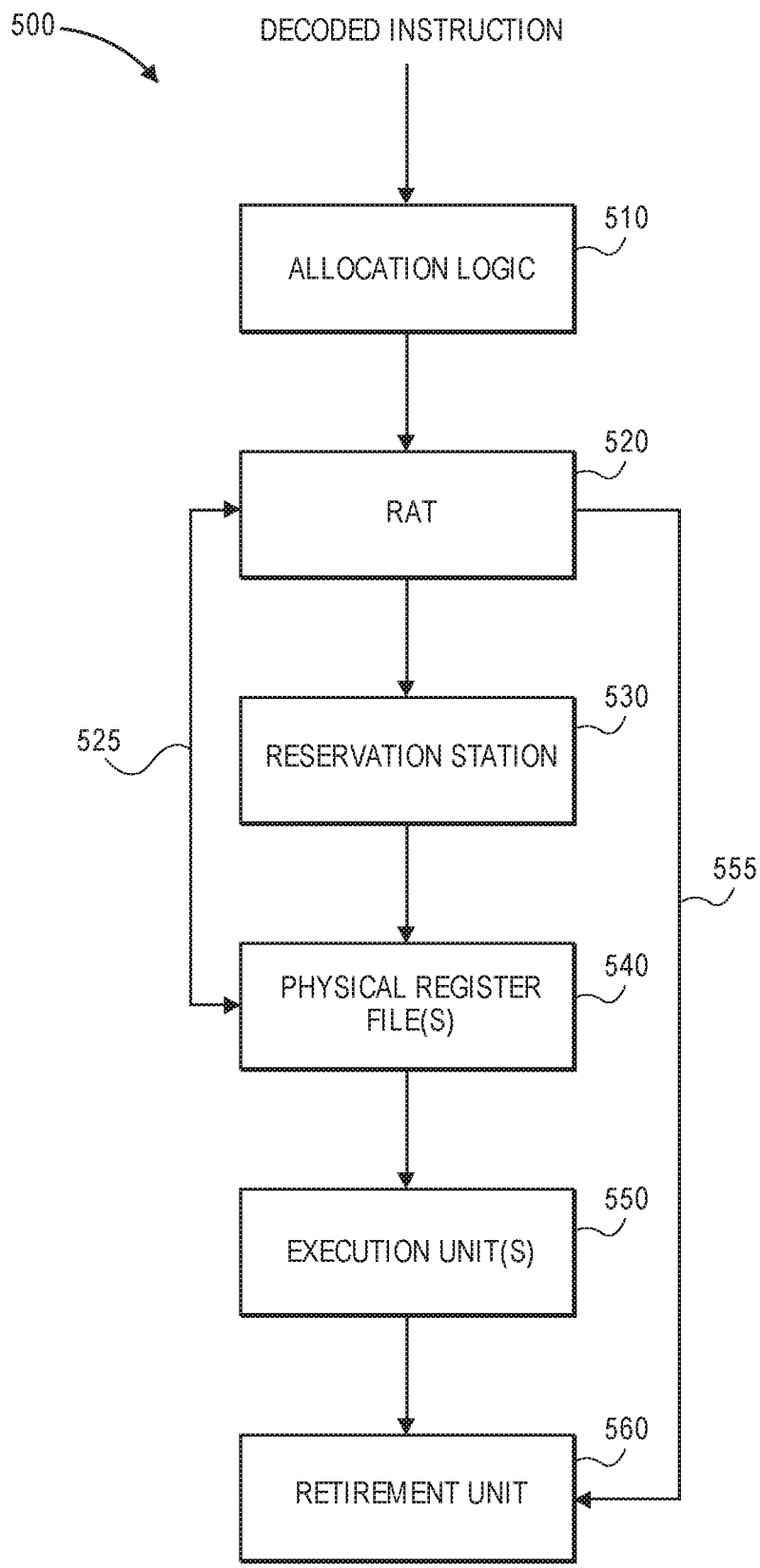
FIG. 5 is a diagram of one embodiment of some components of a core relevant to the shift folding optimization.

FIG. 5 is a block diagram of a portion of a core in accordance that supports shift-folding. The portion of the core 500 shown corresponds to various front end and execution units that in turn couple to one or more back end units. Note that the terms "unit," "logic," and "circuit" are used interchangeably herein to describe hardware circuitry adapted to perform particular tasks. A decoded instruction is provided to an allocation logic 510. In an allocation phase for an instruction, allocation logic 510 may be configured to allocate an entry for a destination operand in a RAT 520 (to point to a physical register in a PRF), and rename one or more source operands present within entries of RAT 520.

Reservation station 530 couples to one or more physical register files 540. In various embodiments, reservation station 530 provides the physical register identifiers from RAT 520 to schedule the given instruction for execution in a given one of one or more execution units 550. Execution unit 550 is coupled to a retirement unit 560, which may be adapted to retire such instructions after execution within execution units 550.

In some embodiments, there can be multiple bypass networks. Specifically, a first bypass path 525 may couple between RAT 520 and PRF 540. Using this bypass path, certain values such as destination values can be directly provided from the RAT to the PRF in a case of a shift-folded instruction. More specifically, this bypass path represents a SFIMM value that is sent to an ALU via reservation station 530 (the ALU can implement a shifter for shift-folding and in cases where immediate folding is supported the ALU can include an adder as well); note also that the IMM value sent may undergo some calculation in flight and may be considered a hidden bypass level. In addition, values from RAT 520 may further be directly provided to retirement unit 560 via a second bypass path 555, e.g., for cases of branches. The process is provided by way of example rather than limitation. One skilled in the art would appreciate that shift-folding can be implemented in other similar contexts.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6:
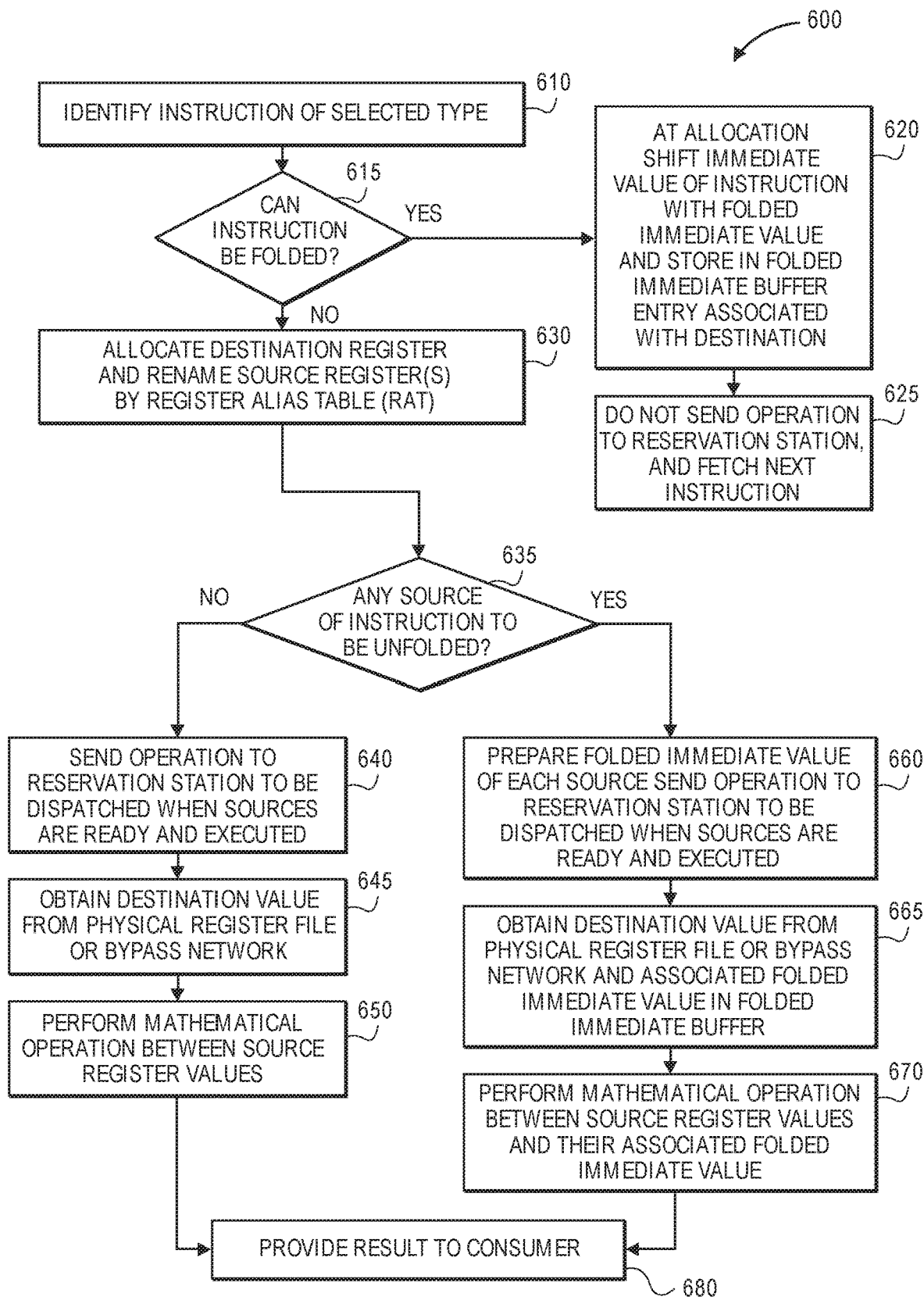
FIG. 6 is a flowchart of one embodiment of the shift-folding process.

FIG. 6 is a flowchart of one embodiment of a shift folding process. The shift folding process 600 may be performed by various hardware components in a processor or core to identify instructions that may possibly be subject to folding and to provide for proper handling of such folded (and non-folded) instructions within a RAT and related structures. For example, the decode logic can be implemented in the decode unit circuit as described herein below with reference to FIG. 12B.

Shift folding 600 begins by identifying an instruction of a selected type (block 610). As an example, such instruction may be a shift operation such as an instruction to shift a register by an immediate value and provide the result to a destination operand. In some embodiments the shift-folding process is instruction-based, in other embodiments, the operations may be performed on a µop basis. At block 615 it is determined whether the instruction can be shift-folded. In one embodiment, such determination may be based on the format of the instruction, or whether the instruction is in a sequence where multiple shift operations are performed. If it is identified that the instruction can be shift-folded, control passes to block 620 where, at an allocation phase, the value in the specified register is shifted by a specified immediate value as indicated by the operands of the shift instruction. The immediate value indicating the number of bits to shift is accumulated. The accumulated immediate shift count result is stored in a shift-folded immediate buffer entry associated with a destination of the instruction. Then at block 625 the instruction is not sent to a reservation station, and instead a next instruction can be fetched for handling. Thus there is no scheduling or execution of this folded shift instruction within the processor pipeline.

At block 625, when an instruction is to be shift-folded, there is no need to rename sources or allocate a PRF entry for the destination, as the instruction is not executed. Instead, an original PRF entry may be used while the immediate value indicating shifted bits is accumulated in the RAT per register accumulator. In one embodiment, a stop can be folded only if the immediate value can be represented in an accumulator with no overflow. Otherwise, the instruction executes in a conventional manner (and one or more sources may be unfolded (as appropriate)).

If instead at diamond 615 it is determined that the instruction cannot be shift-folded, control passes to block 630 where in an allocation phase, a destination register may be allocated within a RAT and one or more source registers may be renamed. For the destination register, it is allocated by the RAT such that a physical register is allocated to the PRF. For the source register(s), renaming by the RAT may occur by mapping a logical register into a physical register location in the PRF.

Next it is determined whether any source of the instruction is to be unfolded at block 635. This determination at block 635 may occur, as even where a µop is not shift-folded one or more of its sources may need to be unfolded. If not, control passes to block 640 where the operation can be sent to a reservation station to be dispatched when its sources are ready for execution. At block 645, a destination value may be obtained from the PRF or a bypass network. Thereafter at block 650 a given mathematical operation may be performed between the source register values, and the result provided to a given consumer (block 680). The consumer of this result may directly receive the value, e.g., via a bypass path. In addition, the result may be stored in appropriate destination location in the PRF.

If instead it is determined that one or more sources are to be unfolded at block 635, control passes to block 660. There, the folded immediate value of each source may be prepared. In addition, the operation is sent to the reservation station to be dispatched when the sources are ready, as discussed above. Next at block 665, a destination value can be obtained from the physical register file or bypass network. In addition, the associated shift-folded immediate value may be obtained from the shift-folded immediate buffer. Thereafter at block 670, a mathematical operation (i.e., a shift here) can be performed between the source register values and their associated shift-folded immediate values, with the result provided to the consumer at block 680 as discussed above. The process of shift folding is provided by example and not limitation while shown at this high level in the embodiment, one skilled in the art would appreciate that there are many variations and alternatives consistent with the principles and techniques described herein.

Figure 7:
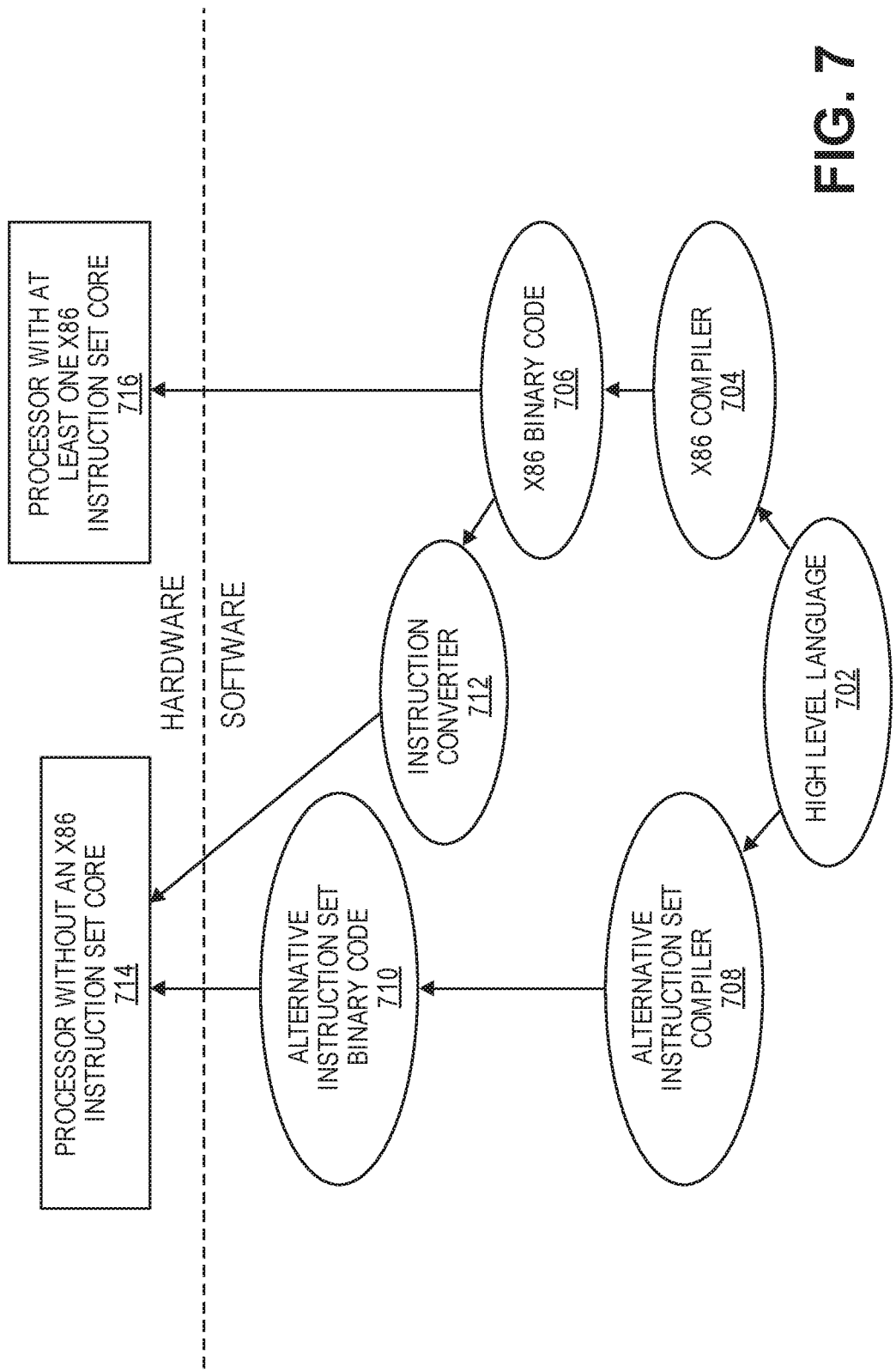
FIG. 7 is a diagram of one embodiment of a process for instruction generation and execution for a program.

FIG. 7 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 704 represents a compiler that may be operable to generate x86 binary code 706 (e.g., object code) that may, with or without additional linkage processing, be executed on the processor with at least one x86 instruction set core 716. Similarly, the program in high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). Instruction converter 712 may be used to convert x86 binary code 1306 into code that may be natively executed by the processor without an x86 instruction set core 714. This converted code might not be the same as alternative instruction set binary code 710; however, the converted code will accomplish the general operation and be made up of instructions from the alternative instruction set. Thus, instruction converter 712 represents software, firmware, hardware, or a combination thereof that, through emulation, simulation or any other process, allows a processor or other electronic device that does not have an x86 instruction set processor or core to execute x86 binary code 1306.

The binary instruction conversion process to an alternate instruction set or the compilation of the X86 code are both possible stages where aspects of the shift-folding process can be implemented or where the correlated processes like the example load coalescing process are implemented. In other embodiments, the shift-folding process is implemented at runtime as a dynamic optimization or any combination thereof.

Figure 8:
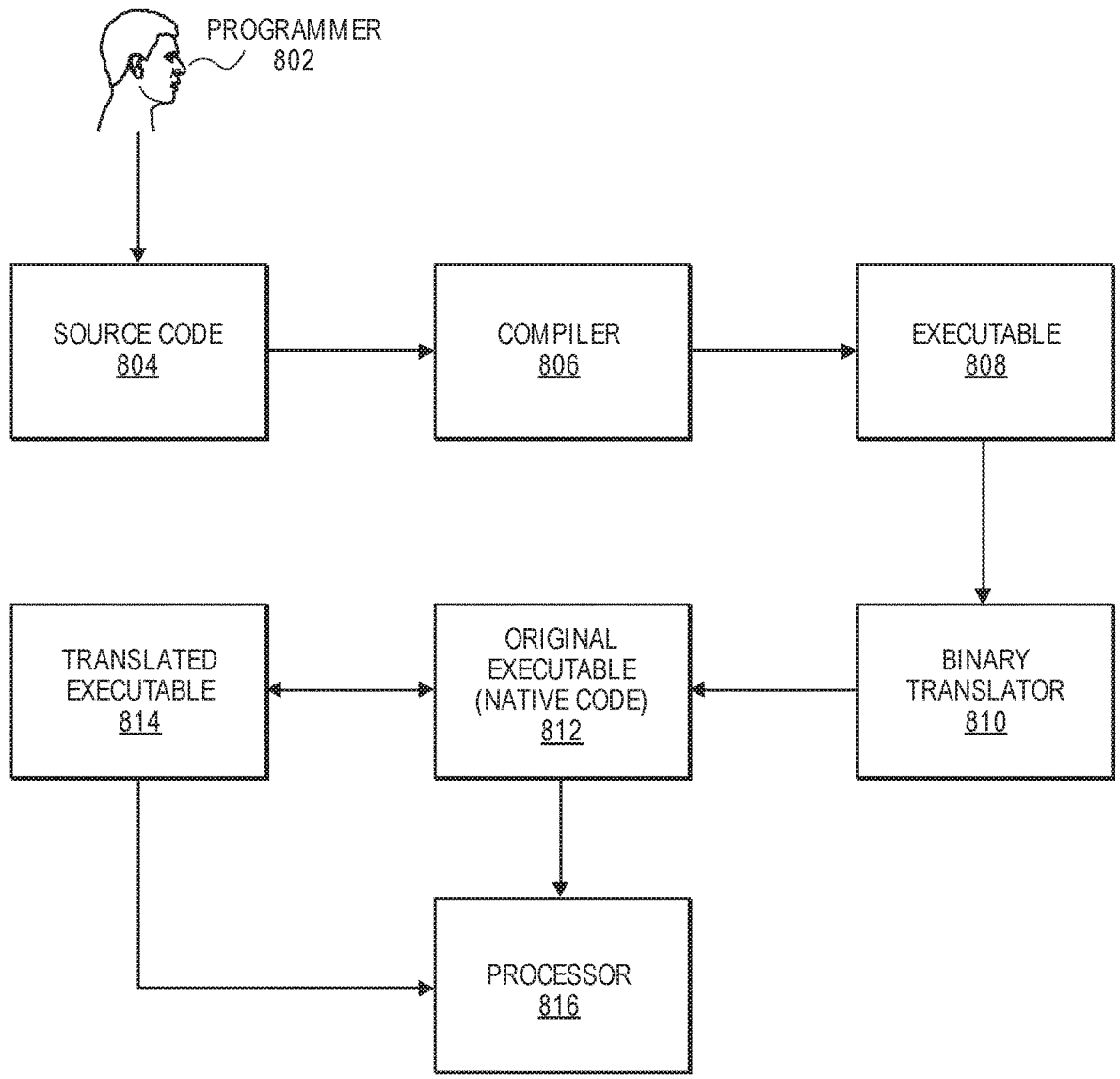
FIG. 8 is a flowchart of one embodiment of a process implementing binary translation in a computer architecture.

FIG. 8 is a block diagram representation of code life cycle according to embodiments of the disclosure. The block diagram of FIG. 8 includes only selected elements for the sake of simplicity and of focusing on certain novel features of the present specification. Note that in some embodiments, additional elements may be present, and in others, not all elements presented here are necessary. Rather, this illustration is presented to illustrate certain advantages achieved by early register reclamation.

In this example, a programmer 802 writes source code 804. This is especially true if programmer 802 is programming in a closer-to-hardware language such as C or x86 assembly.

Compiler 806 compiles source code 804 into object code, and ultimately into executable 808. One advantage to this method is that compiler 806 does not need to execute in real-time (like BT 810 may need to do), so it can take the time to perform a more in-depth code analysis than BT 810. There is a tradeoff however. Compiler 808 may not have the same real-time view of actual hardware usage that BT 810 has. Thus, in some embodiments, compiler 806 and BT 810 may work cooperatively, with compiler 806 providing reclamation hints where possible, and BT 810 filling in the gaps as it is able.

BT 810 has a view of two versions of the code. Original executable 812 is the original, non-optimized native code of executable 808. This may be stored, for example, in transactional cache ("tcache") of main memory. Translated executable 814 is an optimized version of original executable 812, and in some embodiments may be stored in faster on-chip "icache." Icache may generally contain optimized pre-fetched code blocks that are selected according to recently executed instructions. BT 810 may insert reclamation hints into translated executable 814. When executing code, processor 816 may first look to see whether the instructions are cached in icache. If the code can be successfully executed from icache, it is. Otherwise, processor 816 may go out to main memory and retrieve the non-optimized original executable 812. Note that this operation may be necessary not only in the case of icache misses, but also if the cached optimized instructions fail to execute properly, such as if a reclamation hint erroneously marks a register as "dead," and the register turns out to be needed later. In that case, rather than failing catastrophically, processor 816 may simply fetch the non-optimized code and try again.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
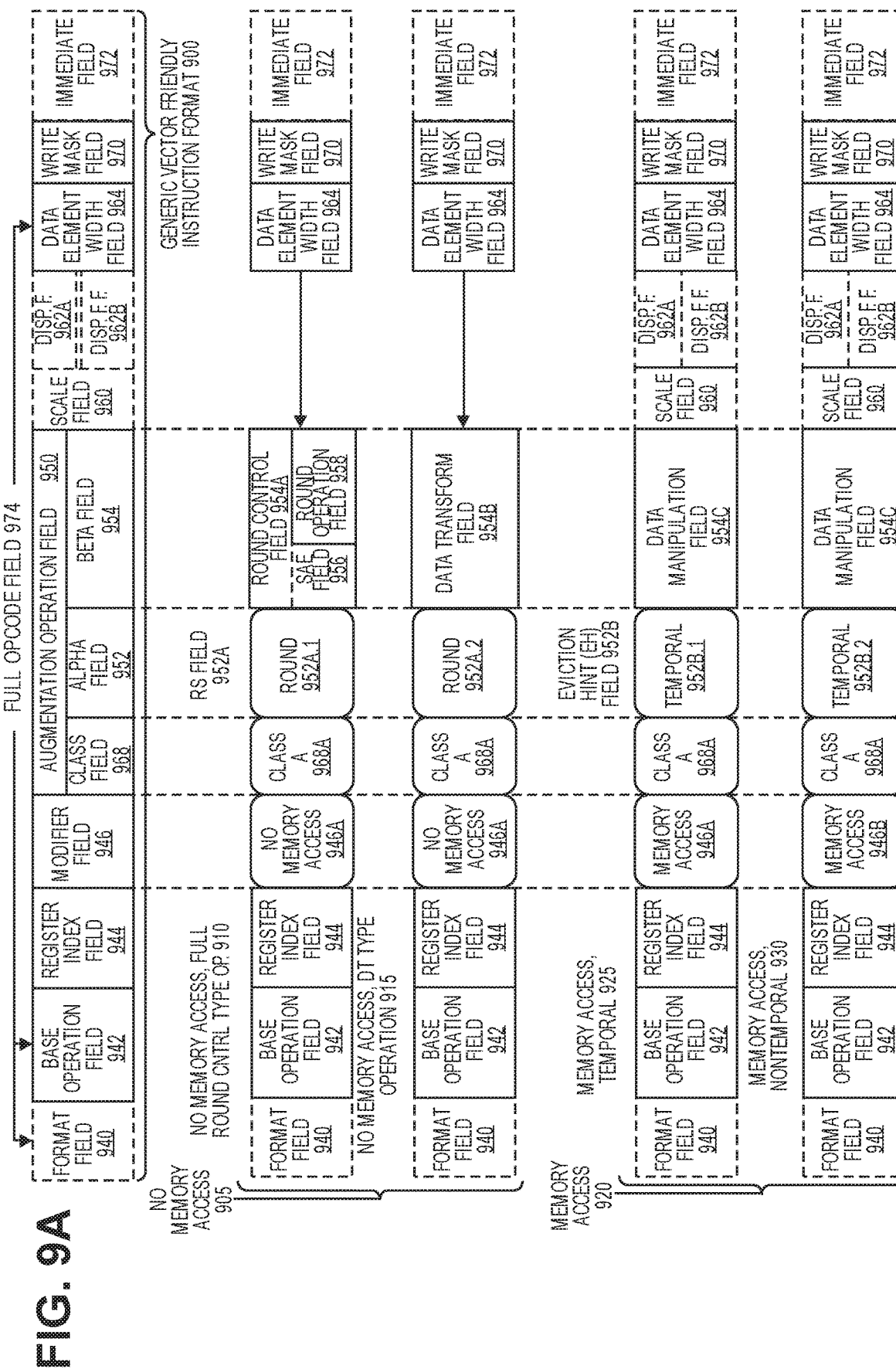
FIGS. 9A-9B are block diagrams illustrating a generic vector friendly instruction format and instruction templates thereof according to embodiments of the invention.
Figure 9B:
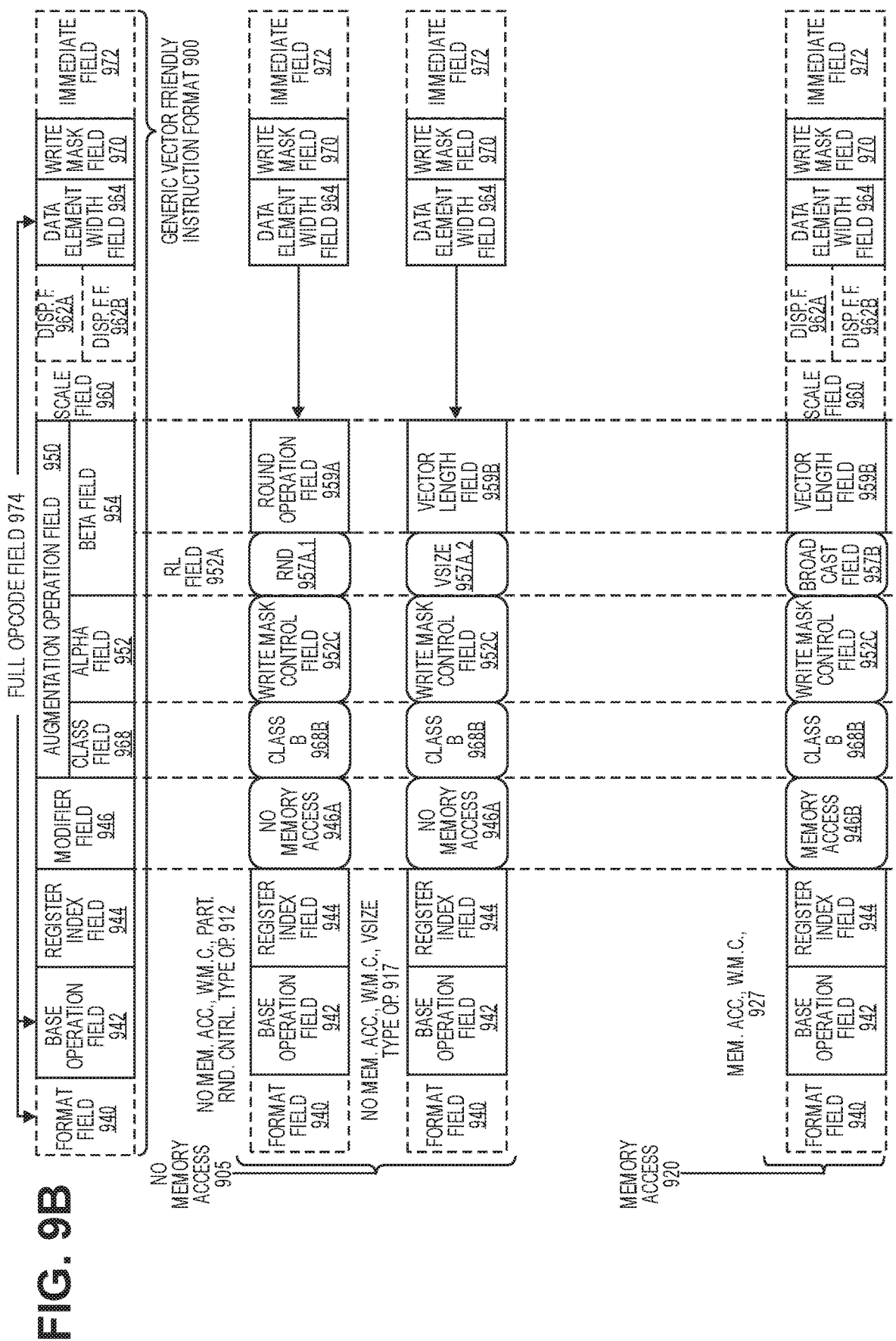

FIGS. 9A-9B are block diagrams illustrating a generic vector friendly instruction format and instruction templates thereof according to embodiments of the invention. FIG. 9A is a block diagram illustrating a generic vector friendly instruction format and class A instruction templates thereof according to embodiments of the invention; while FIG. 9B is a block diagram illustrating the generic vector friendly instruction format and class B instruction templates thereof according to embodiments of the invention. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the invention, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}$*index+base).

Displacement Field 962A—its content is used as part of memory address generation (e.g., for address generation that uses $2^{scale}$*index+base+displacement).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the invention are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

In the no memory access full round control type operation 910 instruction template, the beta field 954 is interpreted as a round control field 954A, whose content(s) provide static rounding. While in the described embodiments of the invention the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the invention where a processor includes a control register for specifying rounding modes, the round operation control field's 950 content overrides that register value.

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Temporal data is data likely to be reused soon enough to benefit from caching. This is, however, a hint, and different processors may implement it in different ways, including ignoring the hint entirely.

Non-temporal data is data unlikely to be reused soon enough to benefit from caching in the 1st-level cache and should be given priority for eviction. This is, however, a hint, and different processors may implement it in different ways, including ignoring the hint entirely.

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the invention where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIG. 10A is a block diagram illustrating an exemplary specific vector friendly instruction format according to embodiments of the invention. FIG. 10A shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10A map are illustrated.

It should be understood that, although embodiments of the invention are described with reference to the specific vector friendly instruction format 1000 in the context of the generic vector friendly instruction format 900 for illustrative purposes, the invention is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the invention is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the invention).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]—R), EVEX.X bit field (EVEX byte 1, bit [6]—X), and 957BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1 s complement) form. Depending on the instruction, an extra different EVEX bit field is used to extend the specifier size to 32 registers.

EVEX.U 968 Class field (EVEX byte 2, bit [2]—U)—If EVEX.U=0, it indicates class A or EVEX.U0; if EVEX.U=1, it indicates class B or EVEX.U1.

Prefix encoding field 1025 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 954 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

FIG. 10B is a block diagram illustrating the fields of the specific vector friendly instruction format 1000 that make up the full opcode field 974 according to one embodiment of the invention. Specifically, the full opcode field 974 includes the format field 940, the base operation field 942, and the data element width (W) field 964. The base operation field 942 includes the prefix encoding field 1025, the opcode map field 1015, and the real opcode field 1030.

FIG. 10C is a block diagram illustrating the fields of the specific vector friendly instruction format 1000 that make up the register index field 944 according to one embodiment of the invention. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Figure 10D:
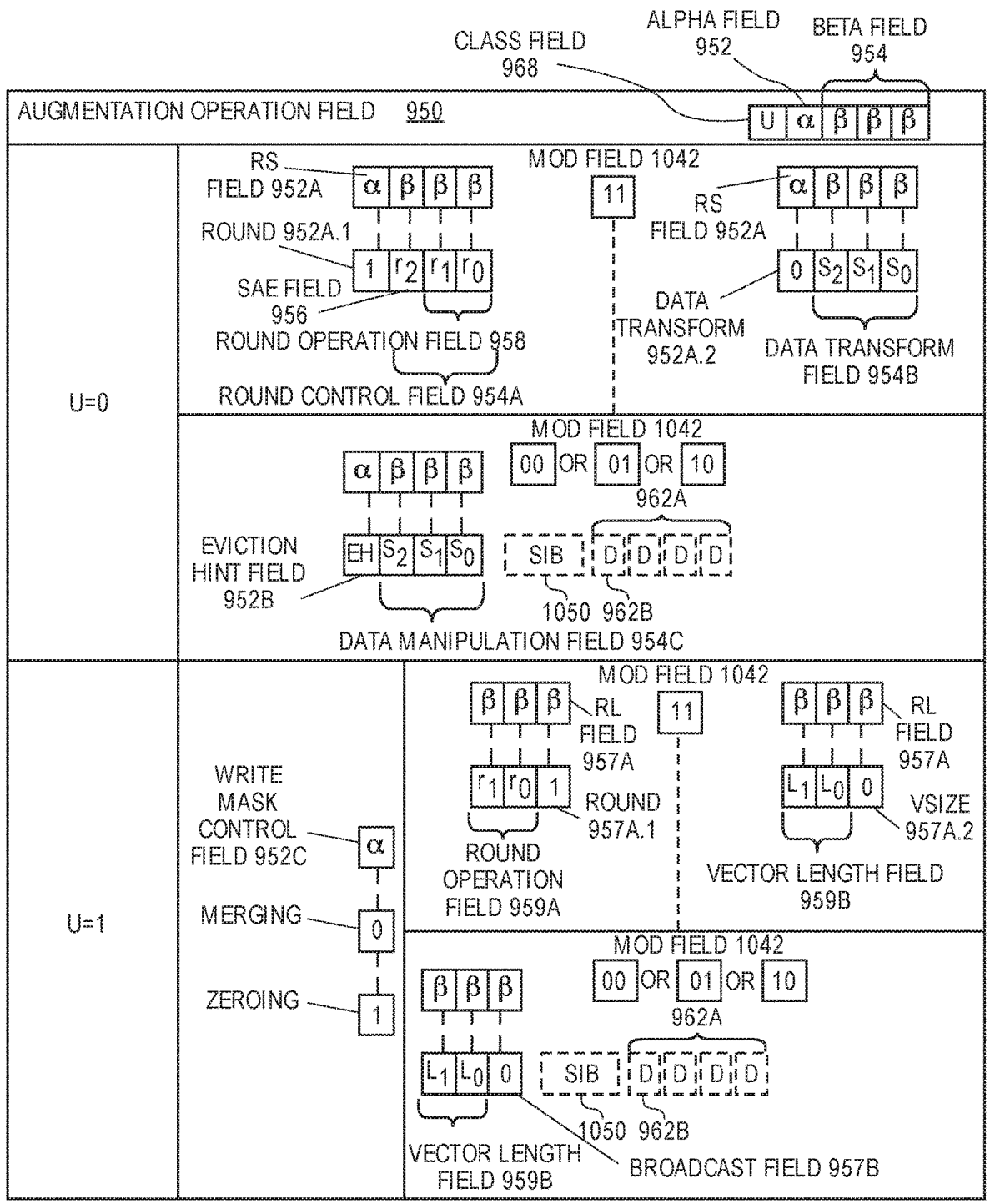
FIG. 10D is a block diagram illustrating the fields of the specific vector friendly instruction format 1000 that make up the augmentation operation field 950 according to one embodiment of the invention.

FIG. 10D is a block diagram illustrating the fields of the specific vector friendly instruction format 1000 that make up the augmentation operation field 950 according to one embodiment of the invention. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—$S_0$) is interpreted as the RL field 957A; when it contains a 1 (round 957A.1) the rest of the beta field 954 (EVEX byte 3, bit [6-5]—$S_{2-1}$) is interpreted as the round operation field 959A, while when the RL field 957A contains a 0 (VSIZE 957.A2) the rest of the beta field 954 (EVEX byte 3, bit [6-5]—$S_{2-1}$) is interpreted as the vector length field 959B (EVEX byte 3, bit [6-5]—$L_{1-0}$). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—$L_{1-0}$) and the broadcast field 957B (EVEX byte 3, bit [4]—B).

Figure 11:
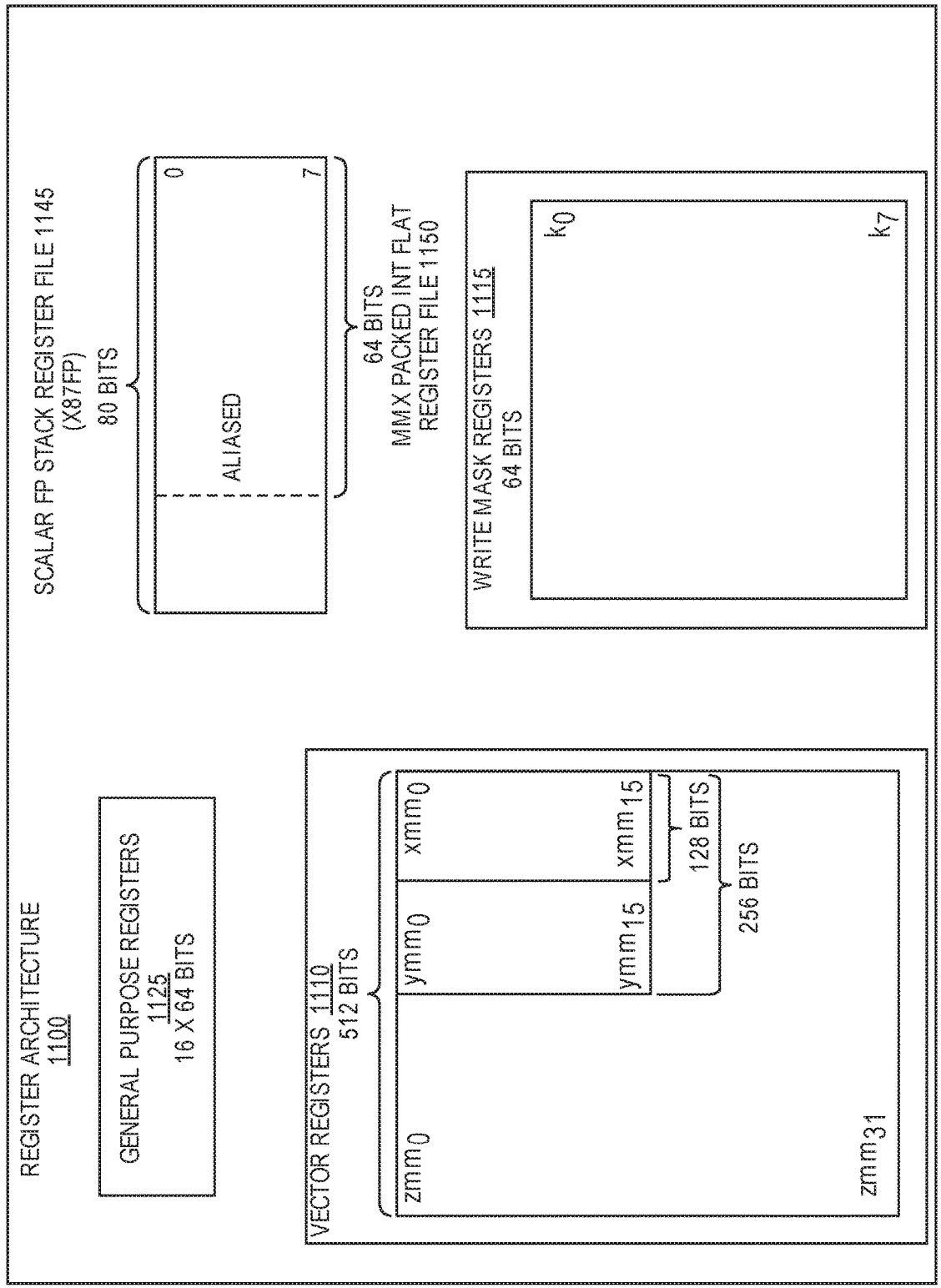
FIG. 11 is a block diagram of a register architecture 1100 according to one embodiment of the invention.

FIG. 11 is a block diagram of a register architecture 1100 according to one embodiment of the invention. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below table.

TABLE II

| Adjustable Vector Length | Class | Operations | Registers |
| --- | --- | --- | --- |
| Instruction Templates that do not include the vector length field 959B | A (FIG. 9A; U = 0) | 910, 915, 925, 930 | zmm registers (the vector length is 64 byte) |
|  | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch circuit 1238, which is coupled to a decode unit circuit 1240. The decode unit circuit 1240 (or decoder) may decode instructions, and generate as an output one or more micro-operations, microcode entry points, microinstructions, other instructions, or other control signals, which are decoded from, or which otherwise reflect, or are derived from, the original instructions. The decode unit circuit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit circuit 1240 or otherwise within the front end unit 1230). The decode unit circuit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch circuit 1238 performs the fetch and length decoding stages 1202 and 1204; 2) the decode unit circuit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13B:
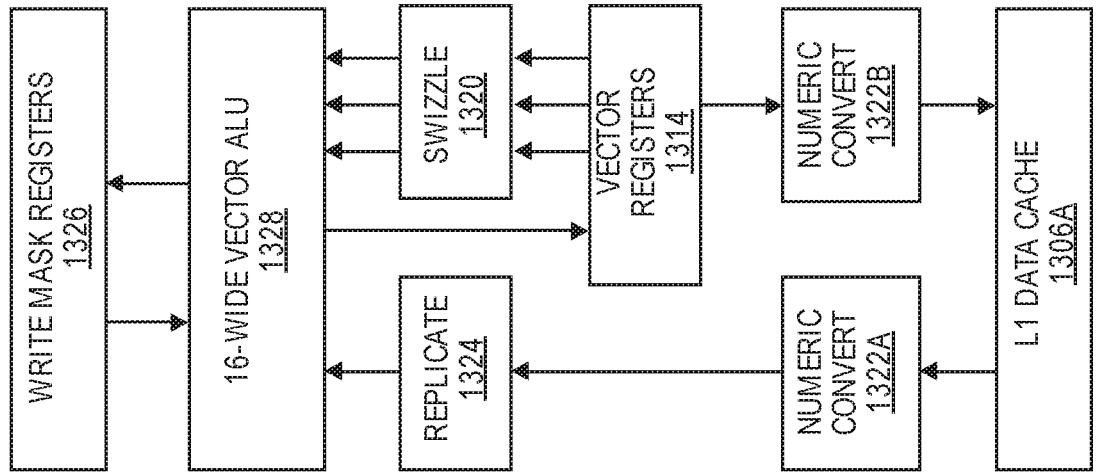
FIGS. 13A-B illustrate a block diagram of a more specific exemplary in-order core architecture, which core would be one of several logic blocks (including other cores of the same type and/or different types) in a chip.
Figure 13A:
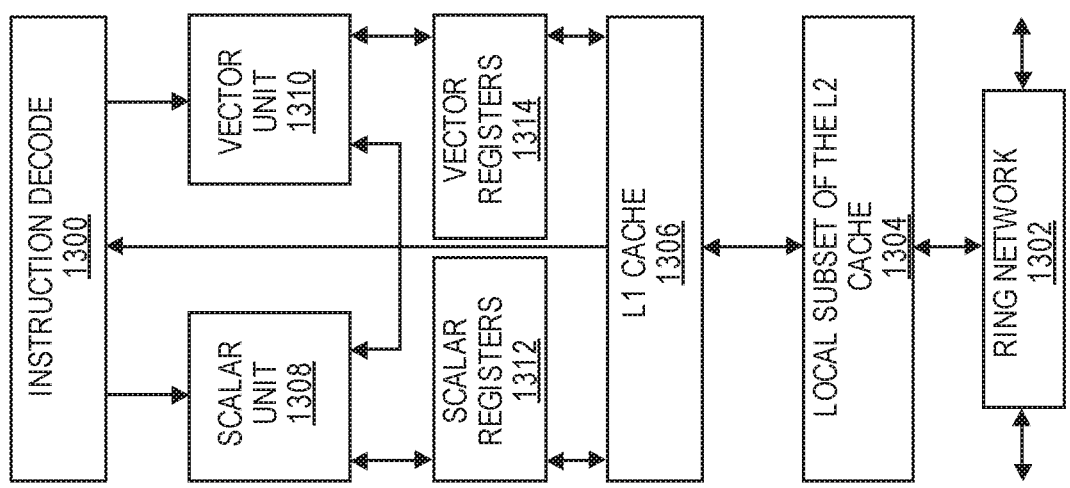

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
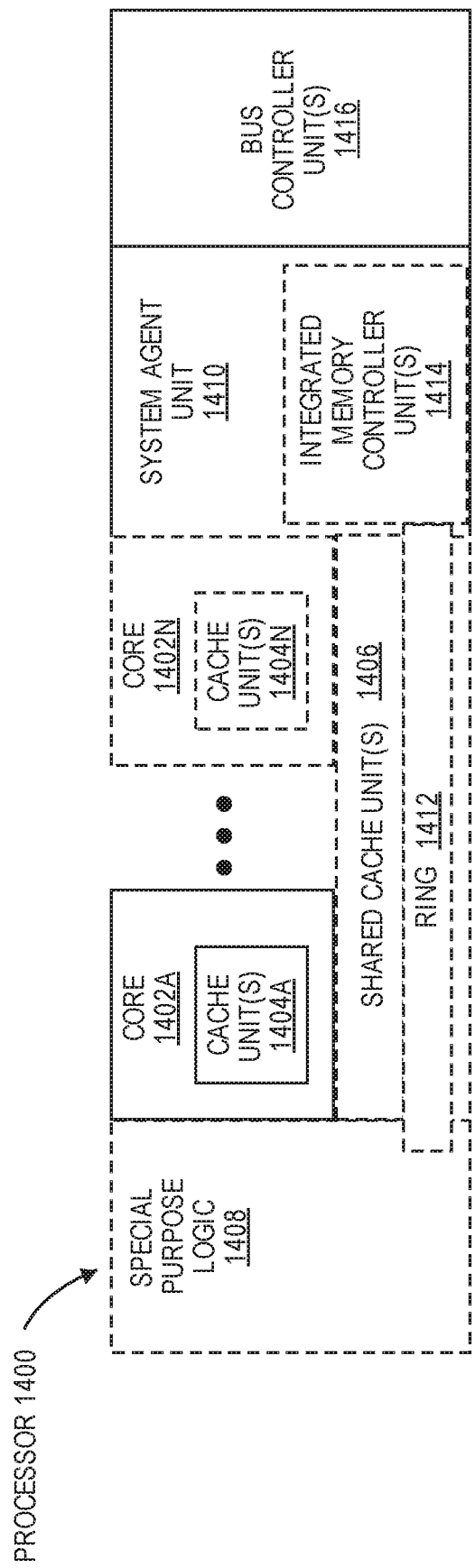
FIG. 14 is a block diagram of a processor 1400 that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
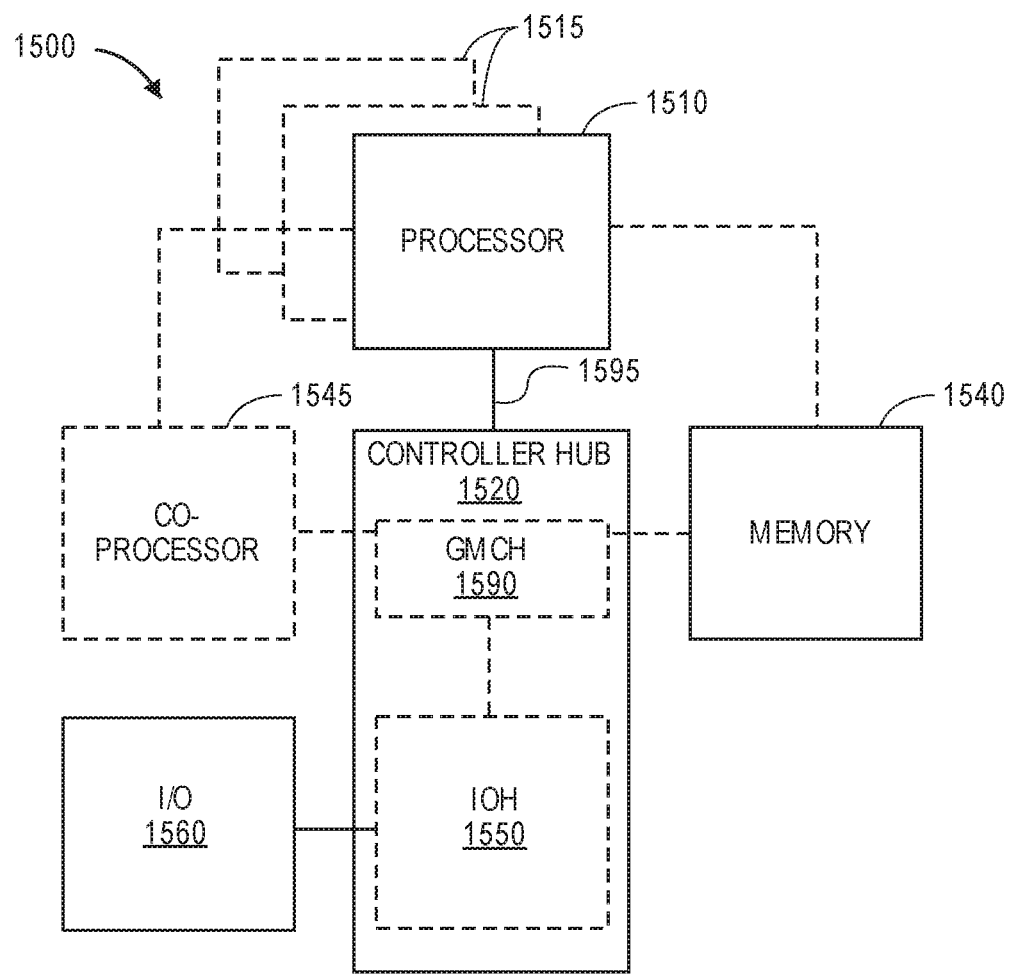
FIGS. 15-18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
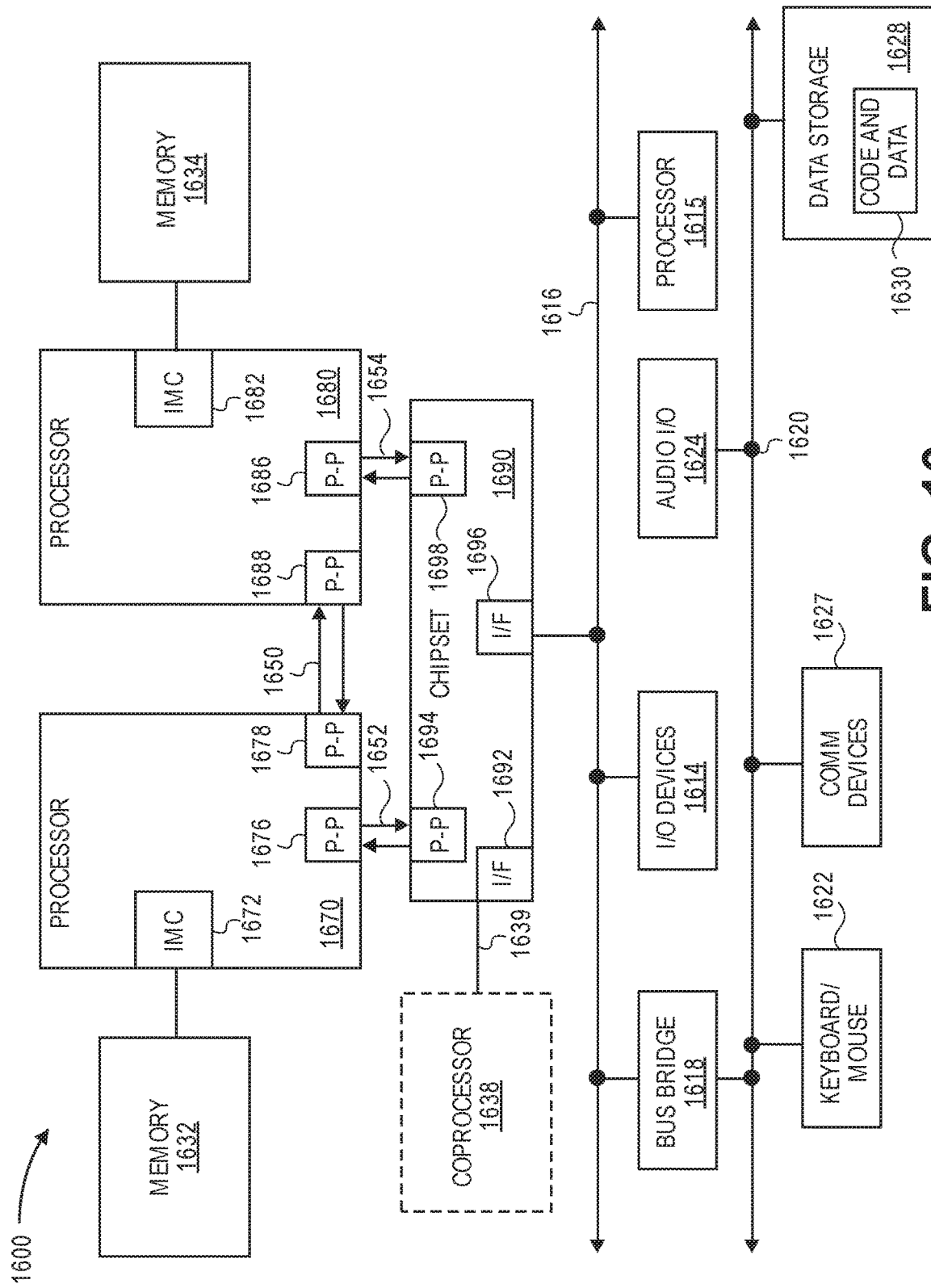

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
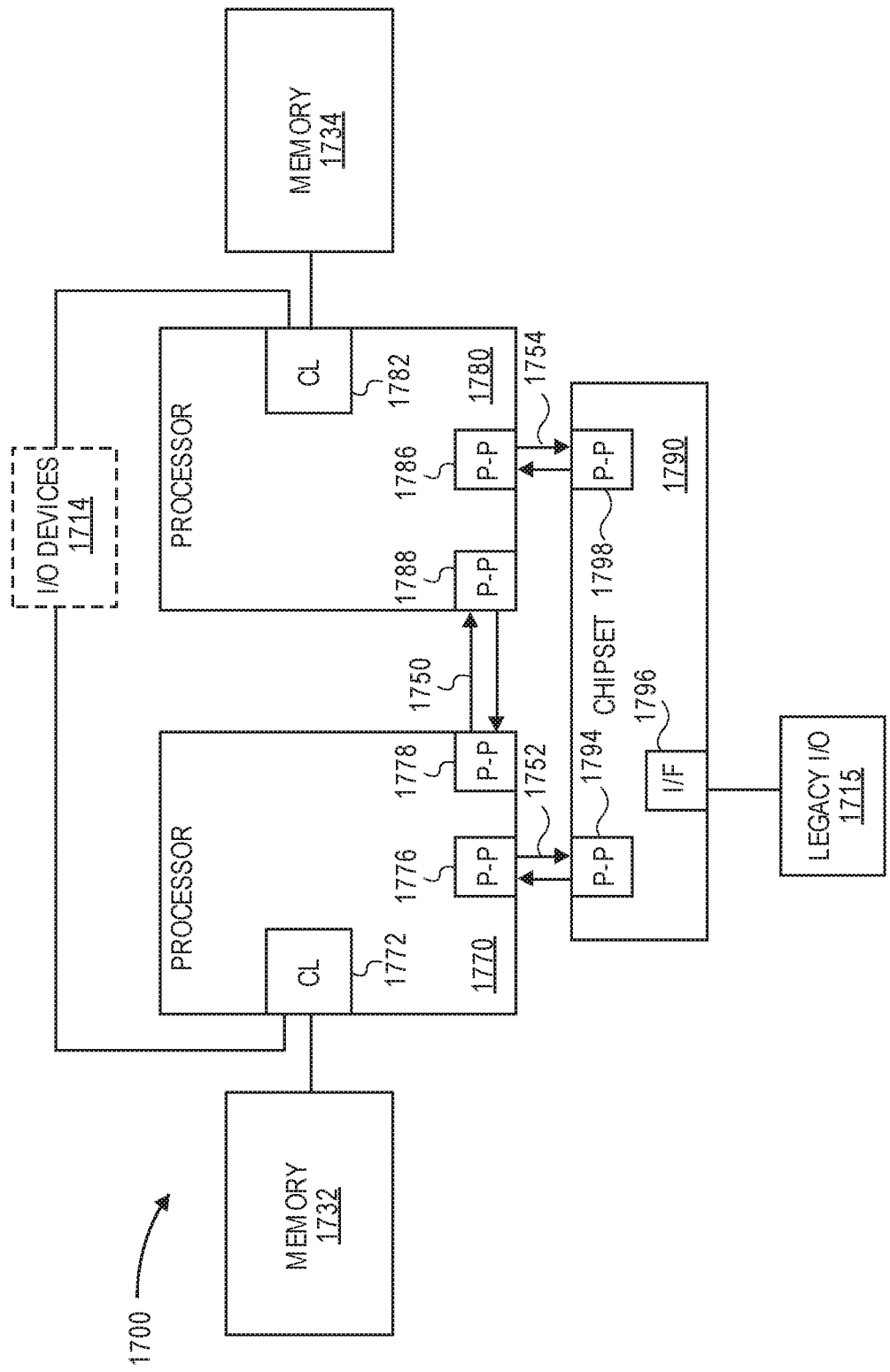

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
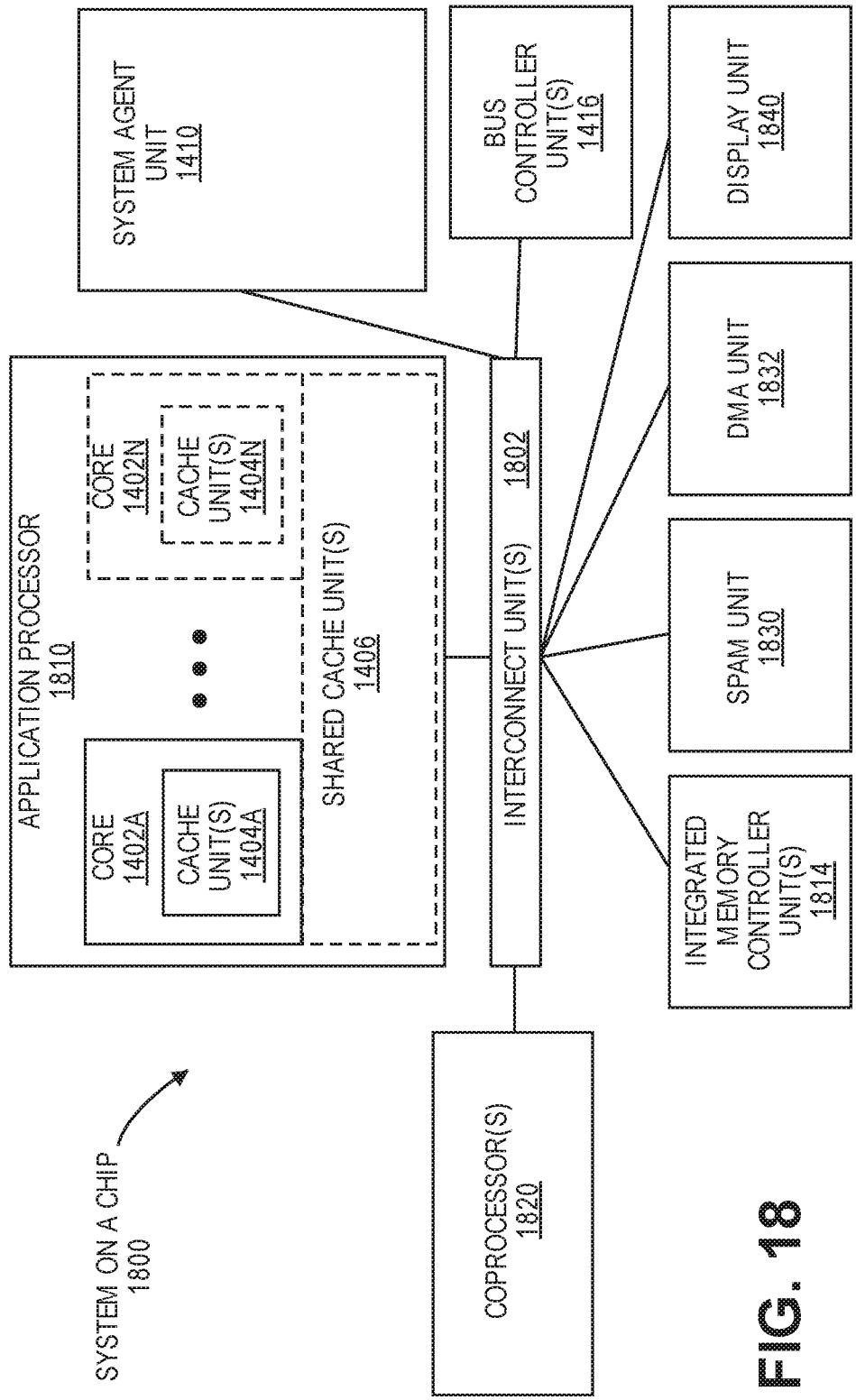

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, which include cache units 1404A-N, and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
   an instruction fetch circuit to retrieve instructions from memory;
   a decode unit circuit to decode retrieved instructions, the decode unit circuit to identify a shift instruction, to accumulate a shift folded immediate value to track a number of bit positions shifted for a source register to enable derivation of the source register value without shifting, and to prevent the shift instruction from allocation to an execution unit of the processor; and
   a set of shifters coupled to a rename alias table to shift a sub-set of a source register based on a value output by one of a set of adders.

2. The processor of claim 1, further comprising:
   a buffer to store the shift folded immediate value.

3. The processor of claim 1, further comprising:
   a rename alias table having therein a set of entries, with each entry including field for a shift folded immediate value and a valid bit to indicate whether the shift folded immediate value in the field is valid.

4. The processor of claim 3, wherein each entry further includes a folded immediate value to accumulate an intermediate value for subsequent instructions to utilize and to enable non-execution of some instructions to store the folded immediate value.

5. The processor of claim 1, further comprising:
   a set of adders coupled to a rename alias table to accumulate the shift folded immediate value.

6. The processor of claim 1, further comprising:
   an arithmetic logic unit coupled to a rename alias table, the arithmetic logic unit to perform a shift of a source register using the shift folded immediate value to perform an unfolding operation.

7. A method comprising:
   identifying, by a decode unit circuit, a shift instruction in a set of fetched instructions;
   accumulating, by a decode unit circuit, a shift folded immediate value responsive to identifying the shift instruction, the shift folded immediate value to track a number of bit positions shifted for a source register identified by the shift instruction to enable derivation of the source register value without shifting;
   suppressing, by the decode unit circuit, the shift instruction from allocation to an execution unit of the processor; and
   adding an operand of the shift instruction to a value in a buffer to accumulate the shift folded immediate value.

8. The method of claim 7, further comprising:
   storing the accumulated shift folded immediate value in an immediate buffer.

9. The method of claim 7, further comprising:
   storing the accumulated shift folded immediate value in a rename alias table having therein a set of entries, with each entry including field for a shift folded immediate value and a valid bit to indicate whether the shift folded immediate value in the field is valid.

10. The method of claim 7, further comprising:
    identifying a folded immediate value and storing the folded immediate value is a same storage location as an accumulated shift folded immediate value.

11. The method of claim 7, further comprising:
    shifting a sub-set of a source register based on a value output by the adding.

12. The method of claim 7, further comprising:
    performing a shift of a source register using the accumulated shift folded immediate value to perform an unfolding operation.

13. A system comprising:
    a dynamic random-access memory to store a set of instructions; and
    a system on a chip coupled to the dynamic random access memory, the system on a chip including a processor, the processor including an instruction fetch circuit to retrieve the set of instructions from the dynamic random access memory, a decode unit circuit to decode retrieved instructions, the decode unit circuit to identify a shift instruction, to accumulate a shift folded immediate value to track a number of bit positions shifted for a source register to enable derivation of a source register value of the source register without shifting, and to prevent the shift instruction from allocation to an execution unit of the processor, and a set of shifters coupled to a rename alias table to shift a sub-set of a source register based on a value output by one of a set of adders.

14. The system of claim 13, further comprising:
    a buffer to store the shift folded immediate value.

15. The system of claim 13, further comprising:
a rename alias table having therein a set of entries, with each entry including field for a shift folded immediate value and a valid bit to indicate whether the shift folded immediate value in the field is valid.

16. The system of claim 13, further comprising:
a set of adders coupled to a rename alias table to accumulate the shift folded immediate value.

17. The system of claim 13, further comprising:
an arithmetic logic unit coupled to a rename alias table, the arithmetic logic unit to perform a shift of a source register using the shift folded immediate value to perform an unfolding operation.

* * * * *